United States Patent [19]
Abe et al.

[11] Patent Number: 5,434,467
[45] Date of Patent: Jul. 18, 1995

[54] VIBRATOR AND DETECTOR CIRCUIT FOR VIBRATING GYRO

[75] Inventors: Shigekazu Abe; Kenji Ogawa, both of Himeji, Japan

[73] Assignee: Mitsubishi Denki Kabushiki Kaisha, Tokyo, Japan

[21] Appl. No.: 197,249

[22] Filed: Feb. 16, 1994

[30] Foreign Application Priority Data

Feb. 17, 1993 [JP] Japan ................... 5-028140

[51] Int. Cl.6 ............................................. H01L 41/08
[52] U.S. Cl. ................................. 310/366; 310/316; 310/369; 310/321
[58] Field of Search ............. 310/316, 317, 319, 321, 310/366–369; 73/497, 504, 505, 517 R, 517 AV; 318/116; 74/5.6 D, 5.6 E

[56] References Cited

U.S. PATENT DOCUMENTS

| | | | |
|---|---|---|---|
| 4,836,023 | 6/1989 | Oikawa | 73/505 |
| 5,049,776 | 9/1991 | Ogawa | 310/321 X |
| 5,117,148 | 5/1992 | Nakamura | 310/367 |
| 5,220,833 | 6/1993 | Nakamura | 73/505 |
| 5,270,607 | 12/1993 | Terajima | 310/316 |
| 5,287,033 | 2/1994 | Morton | 310/316 |
| 5,336,960 | 8/1994 | Shimizu et al. | 310/369 |

FOREIGN PATENT DOCUMENTS 2-223818  9/1990  Japan.
4-106410  4/1992  Japan.

*Primary Examiner*—Mark O. Budd
*Attorney, Agent, or Firm*—Sughrue, Mion, Zinn, Macpeak & Seas

[57] ABSTRACT

A vibrator 1 of a vibrating gyro includes a cylindrical vibrating body 2 made of a piezoelectric ceramic and three electrodes 3, 4, and 5 formed symmetrically with respect to an axis of symmetry 8. A driver power source S0 applies an AC voltage V across the common electrode 3 and the other two electrodes 4, 5 via current detector/driver means 20 and 30, which include an operational amplifier 21 and 31 and a feedback resistor 22 and 32. The outputs of the current detector/driver means 20 and 30 corresponding to the currents $i_L$ and $I_R$ flowing through the electrodes 4 and 5 are input to a differential amplifier 40, the output of which represents the angular velocity of the vibrator 1.

13 Claims, 14 Drawing Sheets

FIG. IA
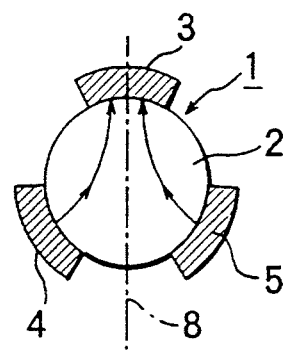
FIG. IB
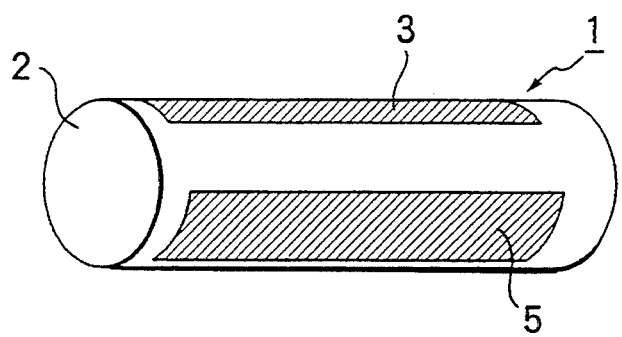
FIG. 2A
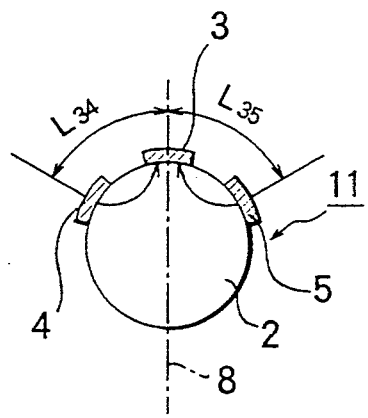
FIG. 2B
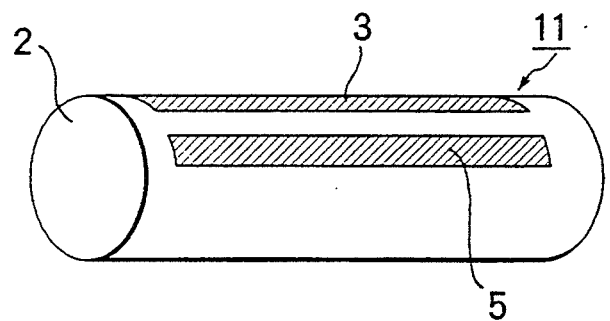

FIG. 19A
FIG. 19B
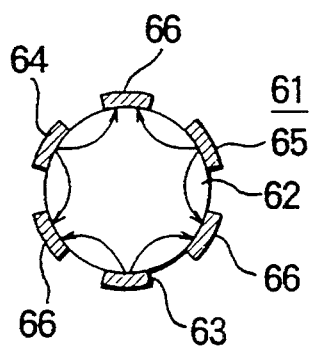
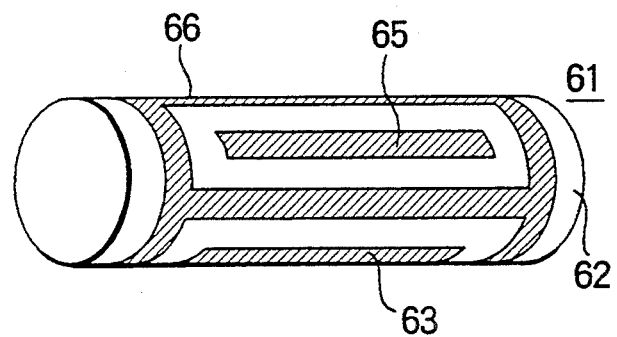

VIBRATOR AND DETECTOR CIRCUIT FOR VIBRATING GYRO

BACKGROUND OF THE INVENTION

This invention relates to vibrators and detector circuits for vibrating gyros, which are mounted on an automotive vehicle for controlling the attitude of the vehicle and for providing information upon the angular velocity of the vehicle for the navigation system thereof.

FIG. 19A is a schematic sectional view of a conventional vibrator of a vibrating gyro, showing the section along the mid-transversal plane thereof. FIG. 19B is a perspective view of the vibrator of FIG. 19A. A vibrator 61 includes a cylindrical vibrating body 62 made of a piezoelectric ceramic, upon the side surface of which sextipolar strip-shaped electrodes 63 through 66 are attached. The sextipolar strip-shaped electrodes 63 through 66 are separated by an equal circumferential angle from each other and extend in the longitudinal direction of the vibrating body 62. Among the electrodes 63 through 66, every second electrode, in the circumferential direction of the vibrating body 62, is coupled to each other at the ends thereof through circumferentially extending annular strips, to form the grounded electrodes 66. Among the remaining three, one is the driver electrode 63 and the other two are the feedback detector electrodes 64 and 65. The electrodes 62 through 64 are positively biased relative to the grounded electrodes 66, such that the vibrating body 62 is polarized as indicated by the arrows in FIG. 19A.

FIG. 20A is a schematic sectional view of another conventional vibrator of a vibrating gyro, showing the section along the mid-transversal plane thereof. FIG. 20B is a perspective view of the vibrator of FIG. 20A. The vibrator is disclosed, for example, in Japanese Patent Publication (Kokoku) No. 4-106410.

The vibrator 71 of FIGS. 20A and 20B includes a vibrating body 72 made of a piezoelectric ceramic and having an axially extending central through-bore 77. Three exterior electrodes 73, 74 and 75 are attached on the outer side surface of the vibrating body 72 at a substantially equal circumferential spacing. An interior electrode 76 is attached on the inner side surface of the vibrating body 72. One of the exterior electrodes 73, 74 and 75 is selected as the driver electrode while the other two are selected as feedback detector electrodes. The interior electrode 76 is grounded. If the exterior electrodes 73, 74 and 75 are negatively biased relative to the through-bore 77, the vibrating body 72 is biased radially, as indicated by the arrows in FIG. 20A.

FIG. 21 is a circuit diagram showing a conventional detector circuit for a vibrating gyro. The vibrator 81 includes a triangular prism-shaped vibrating body 82 made of a material exhibiting a constant modulus of elasticity, such as elinvar. Two driver piezoelectric members 84 and 85 and a feedback piezoelectric member 83 are attached on respective side surfaces of the vibrating body 82 by means of an electrically conductive adhesive.

The driver circuit 89 applies an AC voltage V across the driver piezoelectric member 84 through a resistor 86, and across the driver piezoelectric member 85 through a resistor 87. The output of the feedback piezoelectric member 83 is inputted to the driver circuit 89, such that a loop is formed to vibrate the vibrator 81. The vibrator 81 is thus vibrated in the direction of the Y-axis. The voltages $V_L$ and $V_R$ developed at junction points P1 and P2 between the driver piezoelectric members 84 and 85 and the resistors 86 and 87, respectively, are input to a differential amplifier 88.

The parameters of the circuit are selected in such a way that the voltages $V_L$ and $V_R$ input to the differential amplifier 88 are equalized when the vehicle, etc, upon which the circuit is mounted is not rotating. Thus, provided that the vehicle, etc, is not rotating, the output of the differential amplifier 88 vanishes. However, when the attitude of the vehicle, etc, is changing and the vibrator 81 is rotated around the Z-axis perpendicular to the surface of the drawing in FIG. 21, a vibration in the direction of the X-axis is developed in the vibrating body 82 due to the Coriolis force, and hence a difference is developed between the voltages $V_L$ and the $V_R$ developed at the junction points P1 and P2. The output of the differential amplifier 88, which is proportional to the difference between the voltages $V_L$ and $V_R$, indicates the angular velocity of the rotation of the vibrating body 82.

Next, the principle of the detection of the angular velocity by means of the arrangement of FIG. 21 is described by reference to FIGS. 22A through 22D.

FIG. 22A is a schematic circuit diagram showing the equivalent electrical connections of the driver piezoelectric members 84 and 85 of FIG. 21. As shown in FIG. 22A, the driver piezoelectric members 84 and 85 are coupled across the driver circuit 89 through resistors 86 and 87, respectively. Voltages $V_L$ and $V_R$ are thus applied across the driver piezoelectric members 84 and 85 when the driver circuit 89 applies an AC voltage V across the driver piezoelectric members 84 and 85 through the resistors 86 and 87, respectively. Thus, as shown in FIG. 22B, the driver piezoelectric members 84 and 85 develop forces $F_L$ and $F_R$ perpendicular to the respective main surfaces. These forces $F_L$ and $F_R$ are equal to $A \cdot V_L$ and $A \cdot V_R$, respectively, where A represents the force factor of the driver piezoelectric members 84 and 85. Thus, if the unit vectors along the X-axis and Y-axis are represented by i and j, respectively, the forces FL and FR are given by the following equations:

$$F_L = A \cdot V_L \cdot \cos 30° \cdot i - A \cdot V_L \cdot \sin 30° \cdot j$$

$$F_R = -A \cdot V_R \cdot \cos 30° \cdot i - A \cdot V_R \cdot \sin 30° \cdot j \quad \ldots (1)$$

The vibrator 81 is driven by the resultant of the two forces $F_L$ and $F_R$ at a velocity $v_Y$ in the direction of the Y-axis. Assume here that the vibrator 81 is rotated at an angular velocity $\Omega$ as shown in FIG. 22C. Then, a Coriolis force acting in the direction of X-axis is developed. If the equivalent mass of the vibrating body 82 is represented by m, the Coriolis force Fc is equal to:

$$Fc = 2 \cdot m \cdot \Omega \cdot v_Y \cdot i \quad \ldots (2)$$

Due to the forces $F_L$ and $F_R$ developed in the driver piezoelectric members 84 and 85 and the Coriolis force Fc, the vibrator 81 vibrates at the velocities $v_X$ and $v_Y$ in the X- and Y-axis, respectively, such that a reaction Fz is developed in the vibrator 81. If the mechanical impedances of the vibrator 81 are denoted by $Z_X$ and $Z_Y$, respectively, the reaction Fz is given by the following equation:

$$F_z = -Z_x \cdot v_x \cdot i - Z_Y \cdot v_y \cdot j \quad \ldots (3)$$

Further, the velocity $v_Y$ of the vibrator 81 generates a voltage $V_B$ in the feedback piezoelectric member 83. In its turn, this voltage $V_B$ develops a force $F_B$ which is given by:

$$F_B = A \cdot V_B \cdot j \quad \ldots (4)$$

Since the forces $F_L$ and $F_R$ developed in the driver piezoelectric members 84 and 85, the Coriolis force $F_c$, the reaction $F_Z$ developed in the vibrator 81, and the force $F_B$ generated in the feedback piezoelectric member 83 are balanced, the sum of these forces vanishes:

$$0 = F_L + F_R + F_c + F_z + F_B \quad \ldots (5)$$

The X- and Y-components of the right-hand side of equation (5) must also vanish. Thus, the following equations are obtained:

$$0 = A \cdot \cos 30° \cdot (V_L - V_R) + 2m \cdot v_Y \cdot \Omega - Z_X \cdot v_X$$

$$0 = A \cdot \sin 30° \cdot (V_L + V_R) - Z_Y \cdot v_Y + A \cdot V_B \quad \ldots (6)$$

Thus, the angular velocity $\Omega$ is given by:

$$\Omega = \frac{Z_Y \cdot (Z_X \cdot v_X - A \cdot \cos 30° \cdot (V_L - V_R))}{2 \cdot m \cdot A \cdot (V_B - \sin 30° \cdot (V_L + V_R))} \quad (7)$$

On the other hand, if the admittance of the resistors 86 and 87 are represented by $Y_R$, the current $I_L$ and $I_R$ flowing through the driver piezoelectric members 84 and 85 are given by:

$$I_L = Y_R \cdot (V - V_L)$$

$$I_R = Y_R \cdot (V - V_R) \quad \ldots (8)$$

Further, if the damping admittance of the driver piezoelectric members 84 and 85 is represented by $Y$, and the vibrating velocities of the driver piezoelectric members 84 and 85 in the direction perpendicular to the main surfaces thereof are represented by $v_L$ and $v_R$, respectively, the above currents $I_L$ and $I_R$ are given by:

$$I_L = A \cdot v_L + Y \cdot V_L$$

$$I_R = A \cdot v_R + Y \cdot V_R \quad \ldots (9)$$

Thus, from equations (8) and (9), the following equations are obtained:

$$V_L \cdot (Y + Y_R) = -(A \cdot v_L + Y_R \cdot V) \quad \ldots (10)$$

$$V_R \cdot (Y + Y_R) = -(A \cdot v_R - Y_R \cdot V) \quad \ldots (11)$$

FIG. 22D shows the relationship between the velocities $v_L$ and $v_R$ and the velocities $v_X$ and $v_Y$ by means of a vector diagram, where the $v_X$ and $v_Y$ are the X- and Y-components of the sum of velocities $v_L$ and $v_R$. Using the unit vectors i and j, the X- and Y-components of the velocities vL and vR are represented by:

$$v_L = v_l \cdot \cos 30° \cdot i - v_L \cdot \sin 30° \cdot j$$

$$v_R = v_R \cdot \cos 30° \cdot i - v_R \cdot \sin 30° \cdot j \quad \ldots (12)$$

Thus, the velocity components $v_X$ and $v_Y$ are given by:

$$v_X = \cos 30° \cdot (v_L - v_R)$$

$$v_Y = -\sin 30° \cdot (v_L + v_R) \quad \ldots (13)$$

Further, subtracting equation (11) from equation (10), the following equation is obtained:

$$\begin{aligned}(V_L - V_R) \cdot (Y + Y_R) &= -A \cdot (v_L - v_R) \\ &= -A \cdot v_x / \cos 30°\end{aligned} \quad (14)$$

Eliminating $v_X$ from equation (7) using equation (14), the following representation for the angular velocity $\Omega$ is obtained:

$$\Omega = \frac{-Z_Y \cdot (Z_X \cdot (Y + Y_R) - A^2) \cdot \cos 30° \cdot (V_L - V_R)}{2 \cdot m \cdot A^2 \cdot (V_B - \sin 30° \cdot (V_L + V_R))} \quad (15)$$

On the other hand, since no external current flows through the feedback piezoelectric member 83, the relation $$0 = A \cdot v_Y - Y \cdot V_B$$

holds, such that the following equation is obtained:

$$v_Y = Y \cdot V_B / A \quad \ldots (16)$$

Adding equations (10) and (11) together yields:

$$\begin{aligned}(V_L + V_R) \cdot (Y + Y_R) &= -(A \cdot (v_L - v_R) + 2 \cdot Y_R \cdot V) \\ &= -A \cdot v_Y / \sin 30° - 2 \cdot Y_R \cdot V\end{aligned} \quad (17)$$

Further, from equations (16) and (17), the following equation is obtained:

$$(V_L + V_R) = (Y \cdot V_B - 2 \cdot \sin 30° \cdot Y_R \cdot V)/(\sin 30° \cdot (Y + Y_R)) \quad \ldots (18)$$

Furthermore, substituting equation (18) in equation (15), the following equation is obtained:

$$\Omega = \frac{-Z_Y \cdot (Z_X \cdot (Y + Y_R) - A^2) \cdot \cos 30° \cdot (Y + Y_R) \cdot (V_L - V_R))}{4 \cdot m \cdot A^2 \cdot (Y + V_B - \sin 30° \cdot Y_R \cdot V)} \quad (19)$$

Since the variation of the denominator of the above equation (19) due to the Coriolis force $F_c$ is negligibly small, the angular velocity $\Omega$ is proportional to the voltage difference $(V_L - V_R)$. Thus, the output of the differential amplifier 88, which is proportional to the difference of the voltages $V_L$ and $V_R$ at the junction points P1 and P2 between the resistors 86 and 87 and the driver piezoelectric members 84 and 85, represents the angular velocity $\Omega$ of the vibrator 81 around the Z-axis.

The above conventional vibrators and detector circuit for the vibrating gyro, however, suffer from respective disadvantages.

Namely, in the case of the vibrator 61 of FIG. 19, at least six strip-shaped electrodes 63 through 66 separated by an equal circumferential angle from each other must be formed on the side surface of the vibrating body 62, and every second electrodes 66 thereof must be coupled to each other at the two ends thereof to form the grounded electrodes. The structure of the vibrator 61 is thus complicated.

Further, to form the sextipolar strip-shaped electrodes spaced by an equal circumferential angle, the vibrating body 62 must exhibit the form of an exact cylinder. This requires a precise machining of the vibrating body 62, and raises the production cost. Furthermore, since the number of the electrodes is large, the number of conductors associated therewith becomes also large. Thus the associated circuit is prone to failure and the reliability is reduced.

In the case of the vibrator 71 of FIG. 20, the throughbore 77 is machined through the vibrating body 72 and then the whole inner side surface of the vibrating body 72 is covered with the interior electrode 76. The production steps are thus complicated and a high cost is incurred. Furthermore since the number of the electrodes is large, the number of conductors associated therewith becomes also large. Thus the associated circuit is prone to failure and the reliability is reduced.

In the case of the detector circuit for a vibrating gyro of FIG. 21, the angular velocity $\omega$ is calculated using the principle as expressed by the above equation (19), which includes the terminals involving the force factor A of the driver piezoelectric members 84 and 85, the damping admittance Y and the admittance $Y_R$ of the resistors. The change in the ambient temperature or the secular change accompanying a long service period of the components may induce variations in the force factor A, the damping admittance Y and the admittance of the resistors $Y_R$. The accuracy of the detection of the angular velocity $\Omega$ is thus deteriorated. The temperature compensation of these parameters, on the other hand, is complicated. It is noted that the force factor A and the damping admittance Y of the piezoelectric members cannot be eliminated by selecting appropriate values of the output $V_B$ of the feedback piezoerectric member 83 and the driving voltage V of the driver circuit 89.

SUMMARY OF THE INVENTION

It is therefore an object of this invention to provide a vibrator for a vibrating gyro which is simple in structure, can be produced by simple steps, and is improved in reliability. Further object of this invention is to provide a detector circuit of a vibrating gyro which is capable of detecting the angular velocity accurately even when the force factor and the damping admittance of the piezoelectric members change.

The above object is accomplished by a vibrator for a vibrating gyro which includes: a column-shaped vibrating body exhibiting a bilateral symmetry with respect to a central plane parallel to a longitudinal axis of the column-shaped vibrating body; a common electrode formed on an outer side surface of the vibrating body along an intersection of the outer side surface with the central plane; and two other electrodes formed on the outer side surface of the vibrating body separated from the common electrode by an equal circumferential distance; wherein the vibrating body is polarized across the common electrode and the two other electrodes.

Preferably, the vibrating body is made of a piezoelectric ceramic. Further it is preferred that the vibrating body has the form of a cylinder, a partial cylinder, or a triangular prism.

The object of this invention is also accomplished by a detector circuit of a vibrating gyro using the above vibrator, which includes: driver means, coupled to the two other electrodes, for applying an equal level of voltage across the common electrode and the two other electrodes; current detector means, coupled to the two other electrodes, for detecting currents flowing through the two other electrodes, respectively, the current detector means generating two outputs corresponding to the two currents, respectively; difference calculation means, coupled to the current detector means, for calculating a difference of the two outputs of the current detector means, wherein the output from the calculation means corresponds to an angular velocity of the vibrator around the axis thereof.

Alternatively, the detector circuit of a vibrating gyro according to this invention includes: a vibrator having a prism-shaped vibrator body, a common electrode, and two Piezoelectric members formed upon respective two side surfaces of the vibrator body which are not parallel to each other, wherein the two piezoelectric members subject the vibrator body to vibration when an AC voltage is applied across the common electrode and the two piezoelectric members; piezoelectric member driver means for applying an AC voltage across the common electrode and the two piezoelectric members, the AC voltage applying an equal level of voltage across the common electrode and the two piezoelectric members; first and second current detector means for detecting currents flowing through the two piezoelectric members, respectively, the first and second current detector means generating first and second output, respectively, corresponding to the currents flowing through the two piezoelectric members, respectively; and difference calculation means, coupled to the first and second current detector means, for calculating a difference of the first and second outputs of the first and second current detector means, wherein the difference corresponds to an angular velocity of the vibrator.

Preferably, the vibrator body has the form of a rectangular prism exhibiting a square transversal section and the two piezoelectric members are formed on adjacent two side surfaces of the vibrator body.

It is further preferred that the first current detector means includes: a first operational amplifier having a non-inverting input terminal coupled to an AC voltage source and an inverting input terminal coupled to a first of the two piezoelectric members; and a first feedback resistor coupled across an output of the first operational amplifier and the inverting input terminal of the first operational amplifier; the output of the first operational amplifier being input to a first input of the difference calculation means; and the second current detector means includes: a second operational amplifier having a non-inverting input terminal coupled to the AC voltage source and an inverting input terminal coupled to a second of the two piezoelectric members; and a second feedback resistor coupled across an output of the second operational amplifier and the inverting input terminal of the second operational amplifier; the output of the second operational amplifier being input to a second input of the difference calculation means.

Alternatively, the first current detector means includes: a first operational amplifier having a non-inverting input terminal coupled to an AC voltage source through a detection resistor and an inverting input terminal coupled to a first of the two piezoelectric members; and a first feedback resistor coupled across an output of the first operational amplifier and the inverting input terminal of the first operational amplifier; the output of the first operational amplifier being input to a first input of the difference calculation means; wherein the detection resistor is coupled across the AC voltage source and a second one of the two piezoelectric members, the second current detector means including the detection resistor, a junction point between the detection resistor, the AC voltage source being coupled to a second input of the difference calculation means.

Still alternatively, the first current detector means includes: a first operational amplifier having a grounded non-inverting input terminal and an inverting input terminal coupled to a first of the two piezoelectric members; and a first feedback resistor coupled across an output of the first operational amplifier and the inverting input terminal of the first operational amplifier; the output of the first operational amplifier being input to first input of the difference calculation means; and the second current detector means includes: a second operational amplifier having a grounded non-inverting input terminal and an inverting input terminal coupled to a second of the two piezoelectric members; and a second feedback resistor coupled across an output of the second operational amplifier and the inverting input terminal of the second operational amplifier; the output of the second operational amplifier being input to second input of the difference calculation means. Preferably, the detector circuit further includes: an inverting amplifier having an input coupled to the piezoelectric member driver means; a first capacitor coupled across an output of the inverting amplifier and an inverting input terminal of the first operational amplifier; and a second capacitor coupled across the output of the inverting amplifier and an inverting input terminal of the second operational amplifier.

A still another detector circuit of a vibrating gyro according to this invention includes: a vibrator including: a prism-shaped vibrator body; a common electrode; and two piezoelectric members formed upon respective two side surfaces of the vibrator body which are not parallel to each other, wherein the two piezoelectric members vibrates the vibrator body when an AC voltage is applied across the common electrode and the two piezoelectric members; first and second current detector means for detecting currents flowing through the two piezoelectric members, respectively, the first and second current detector means generating first and second outputs corresponding to the currents flowing through the two piezoelectric members, respectively; piezoelectric member driver means for driving the two piezoelectric members at an equal voltage level; feedback means for feeding back an output of at east one of the first and second current detector means to the piezoelectric member driver means, thereby subjecting the vibrator into self-oscillation; and difference calculation means, coupled to the first and second current detector means, for calculating a difference of the first and second outputs of the first and second current detector means, wherein the difference corresponds to an angular velocity of the vibrator. Preferably, the piezoelectric member driver means consists of an inverting amplifier, and the feedback means feeds back a voltage corresponding to a velocity of the vibrator body along a predetermined direction.

Further, the first current detector means may include: a first operational amplifier having a non-inverting input terminal coupled to an output of the piezoelectric member driver means and an inverting input terminal coupled to a first of the two piezoelectric members; and a first feedback resistor coupled across an output of the first operational amplifier and the inverting input terminal of the first operational amplifier; the output of the first operational amplifier being input to a first input of the feedback means; and the second current detector means may include: a second operational amplifier having a non-inverting input terminal coupled to the output of the piezoelectric member driver means and an inverting input terminal coupled to a second of the two piezoelectric members; and a second feedback resistor coupled across an output of the second operational amplifier and the inverting input terminal of the second operational amplifier; the output of the second operational amplifier being input to a second input of the feedback means.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 1A is a schematic sectional view of a vibrator of a vibrating gyro according to this invention, showing the section along the mid-transversal plane thereof;

FIG. 1B is a perspective view of the vibrator of FIG. 1A;

FIG. 2A is a schematic sectional view of another vibrator of a vibrating gyro according to this invention, showing the section along the mid-transversal plane thereof;

FIG. 2B is a perspective view of the vibrator of FIG. 2A;

FIG. 19A is a schematic sectional view of a conventional vibrator of a vibrating gyro, showing the section along the mid-transversal plane thereof;

FIG. 19B is a perspective view of the vibrator of FIG. 19A;

In the drawings, like reference numerals represent like or corresponding parts or portions.

DETAILED DESCRIPTION OF THE PREFERRED EMBODIMENTS

Figure 3A:
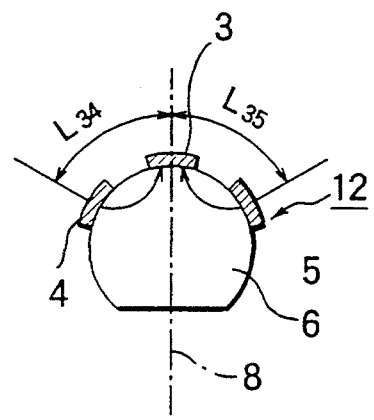
FIG. 3A is a schematic sectional view of still another vibrator for a vibrating gyro according to this invention, showing the section along the mid-transversal plane thereof.

Referring now to the accompanying drawings, the preferred embodiments of this invention are described.

FIG. 1A is a schematic sectional view of a vibrator of a vibrating gyro according to this invention, showing the section along the mid-transversal plane thereof. FIG. 1B is a perspective view of the vibrator of FIG. 1A. The vibrator 1 includes a cylindrical vibrating body 2 made of a piezoelectric ceramic. Upon the side surface of the vibrating body 2 are formed three electrodes 3, 4, and 5 along the longitudinal direction of the vibrating body 2 by means of, for example, printing vapor deposition, sputtering, silver paste sintering and metal plating.

The electrodes 3, 4 and 5 are separated from each other by substantially equal circumferential spacings. One of the electrodes 3, 4 and 5, for example the electrode 3, is selected as the common electrode. A voltage is applied across the common electrode 3 and the other two electrodes 4 and 5, such that the vibrating body 2 is polarized from the electrodes 4 and 5 toward the electrode 3 as shown by the arrows in FIG. 1A.

In the case of the embodiment of FIG. 1A and 1B, the electrodes 3, 4 and 5 are formed at an equal circumferential spacing from each other. Thus, an arbitrary one of the electrodes 3, 4 and 5 may be selected as the common electrode, and the circumferential separations of the common electrode from the other two electrodes are equal to each other. The electrodes 4 and 5 are thus situated symmetrically with respect to the axis of symmetry 8. The vibrator 1 of this embodiment is supported at the positions corresponding to the two nodal points of the vibrator 1.

Figure 20A:
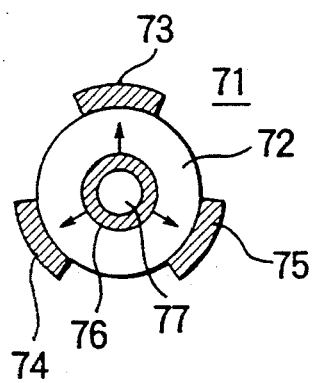
FIG. 20A is a schematic sectional view of another conventional vibrator of a vibrating gyro, showing the section along the mid-transversal plane thereof.
Figure 20B:
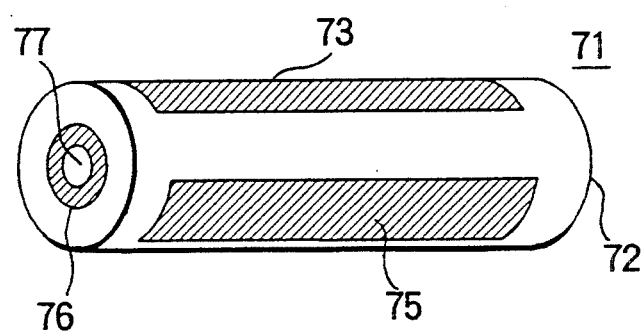
FIG. 20B is a perspective view of the vibrator of FIG. 20A.

According to the embodiment of FIG. 1A and 1B, the vibrating body 2 has the form of a cylinder. Compared with the hollow cylindrical form of the vibrating body 72 of FIG. 20, the production thereof is simpler and hence the cost of production can be reduced.

Further, the electrodes 3, 4 and 5 are tripodal, and exhibit simple forms. The electrodes 3, 4 and 5 can thus be formed by means of printing, vapor deposition, sputtering, silver paste sintering and metal plating, etc. The formation of the electrodes 3, 4 and 5 is simpler than that of the sextipolar electrodes of FIG. 19 or that of the interior electrode covering the whole inner side surface of the hollow cylindrical vibrating body 72.

Furthermore, since the electrodes are tripodal, three electrical leads suffice for making electrical connection thereto. The probability of the wiring failure is thus reduced and the reliability is improved.

Figure 21:
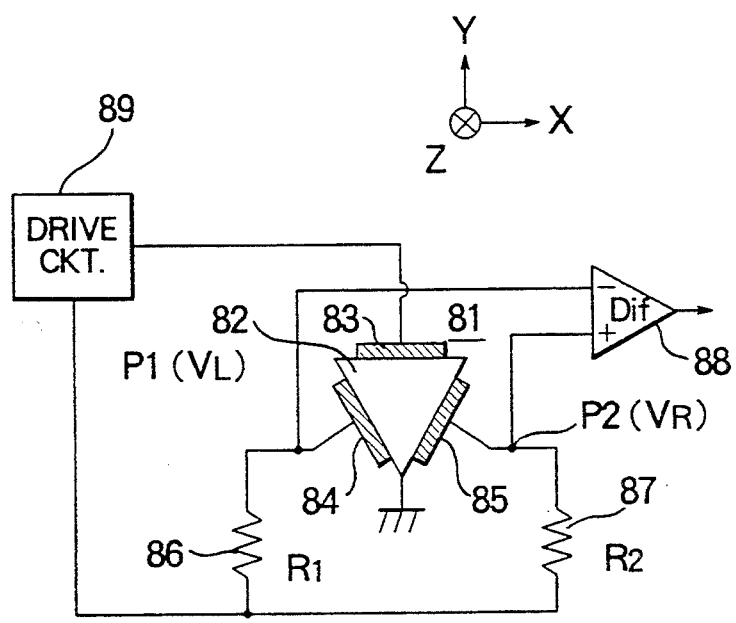
FIG. 21 is a circuit diagram showing a conventional detector circuit for a vibrating gyro.

Still further, since the vibrating body 2 is made of a piezoelectric ceramic, there is no need for attaching piezoelectric members thereupon. In the case of the vibrator 82 of FIG. 21, on the other hand, it is necessary to attach the piezoelectric members 83 through 85 upon the vibrating body 82 by means of an adhesive. Thus, the problem of the variation of the characteristics of the vibrator due to the difference in the thermal expansion coefficients of the piezoelectric members 83 through 85 and the vibrating body 82 caused by the change in the ambient temperature does not occur in the case of the vibrator 1.

FIG. 2A is a schematic sectional view of another vibrator of a vibrating gyro according to this invention, showing the section along the mid-transversal plane thereof. FIG. 2B is a perspective view of the vibrator of FIG. 2A. The vibrator 11 includes a cylindrical vibrating body 2 made of a piezoelectric ceramic. Upon the side surface of the vibrating body 2 are formed three electrodes 3, 4, and 5 along the longitudinal direction of the vibrating body 2 by means of, for example, printing, vapor deposition, sputtering, silver paste sintering and metal plating.

The central electrode 3 is the common electrode. The other two electrodes 4 and 5 are separated from the common electrode 3 by an equal predetermined circumferential spacing $L_{34}$ and $L_{35}$, respectively, to the opposite circumferential directions. A voltage is applied across the common electrode 3 and the other two electrodes 4 and 5, such that the vibrating body 2 is polarized from the electrodes 4 and 5 toward the common electrode 3 as shown by the arrows in FIG. 2A.

The electrodes 4 and 5 are situated symmetrically with respect to the axis of symmetry 8. The vibrator 11 of this embodiment is supported at the positions corresponding to the two nodal points of the vibrator 11.

Except for the positions of the three electrodes 3, 4 and 5 upon the vibrating body 2, the structure of vibrator of this embodiment is similar to that of FIG. 1A and 1B, and similar advantages can be obtained.

Figure 3B:
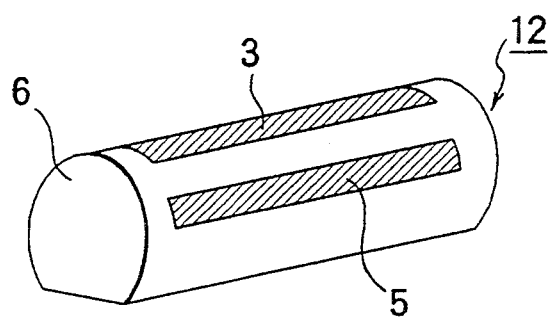
FIG. 3B is a perspective view of the vibrator of FIG. 3A.

FIG. 3A is a schematic sectional view of still another vibrator for a vibrating gyro according to this invention, showing the section along the mid-transversal plane thereof. FIG. 3B is a perspective view of the vibrator of FIG. 3A. The vibrator 12 includes a vibrating body 6 made of a piezoelectric ceramic. The vibrating body 6 has the form of a partial cylinder, the transverse section of which exhibits the form of a segment of a circle contained by a straight line and the part of the circumference of the circle cut off by the line. The vibrating body 6 exhibits bilateral symmetry with respect to the axis of symmetry 8.

Upon the cylindrical side surface of the vibrating body 6 are formed three electrodes 3, 4, and 5 along the longitudinal direction of the vibrating body 6 by means of, for example, printing, vapor deposition, sputtering, silver paste sintering and metal plating. The common electrode 3 is formed upon the side surface of the vibrating body 6 in registry with the axis of symmetry 8 of the vibrating body 6, at the side opposite to the flat side surface of the vibrating body 6. The other two electrodes 4 and 5 are separated from the common electrode 3 by an equal predetermined circumferential spacing L34 and L3s, respectively, to the opposite circumferential directions. A voltage is applied across the common electrode 3 and the other two electrodes 4 and 5, such that the vibrating body 6 is polarized from the electrodes 4 and 5 toward the common electrode 3 as shown by the arrows in FIG. 3A.

The electrodes 4 and 5 are situated symmetrically with respect to the axis of symmetry 8. The vibrator 12 of this embodiment is supported at the positions corresponding to the two nodal points of the vibrator ]2.

Except for the positions of the three electrodes 3, 4 and 5 upon the vibrating body 6 and the form of the vibrating body 6, the structure of vibrator of this embodiment is also similar to that of FIG. 1A and 1B, and similar advantages can be obtained.

Figure 4A:
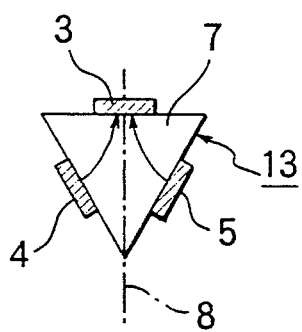
FIG. 4A is a schematic sectional view of still further vibrator for a vibrating gyro according to this invention, showing the section along the mid-transversal plane thereof.
Figure 4B:
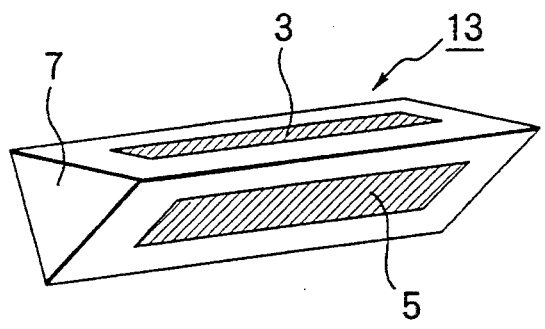
FIG. 4B is a perspective view of the vibrator of FIG. 4A.

FIG. 4A is a schematic sectional view of still further vibrator for a vibrating gyro according to this invention, showing the section along the mid-transversal plane thereof. FIG. 4B is a perspective view of the vibrator of FIG. 4A. The vibrator 13 includes a vibrating body 7 made of a piezoelectric ceramic. The vibrating body 7 has the form of a triangular prism, the transverse section of which exhibits the form of an equilateral triangle.

Upon the three respective side surfaces of the vibrating body 7 are formed three electrodes 3, 4, and 5, respectively, along the longitudinal direction of the vibrating body 7 by means of, for example, printing, vapor deposition, sputtering, silver paste sintering and metal plating. The electrodes 3, 4 and 5 are separated from each other by an equal circumferential spacing. Assume that the electrode 3 is selected as the common electrode. A voltage is applied across the common electrode 3 and the other two electrodes 4 and 5, and the vibrating body 7 is polarized from the electrodes 4 and 5 toward the common electrode 3 as shown by the arrows in FIG. 4A.

The three electrodes 3, 4 and 5 are formed along the central longitudinal line of the respective three side surfaces. The common electrode 3 is situated upon the axis of symmetry 8 of the vibrating body 7 running between the electrodes 4 and 5. The electrodes 4 and 5 are situated symmetrically with respect to the axis of symmetry 8. The vibrator 13 of this embodiment is supported at the positions corresponding to the two nodal points of the vibrator 13.

Except for the positions of the three electrodes 3, 4 and 5 upon the vibrating body 7 and the form of the vibrating body 7, the structure of vibrator of this embodiment is also similar to that of FIG. 1A and 1B, and similar advantages can be obtained.

Figure 5:
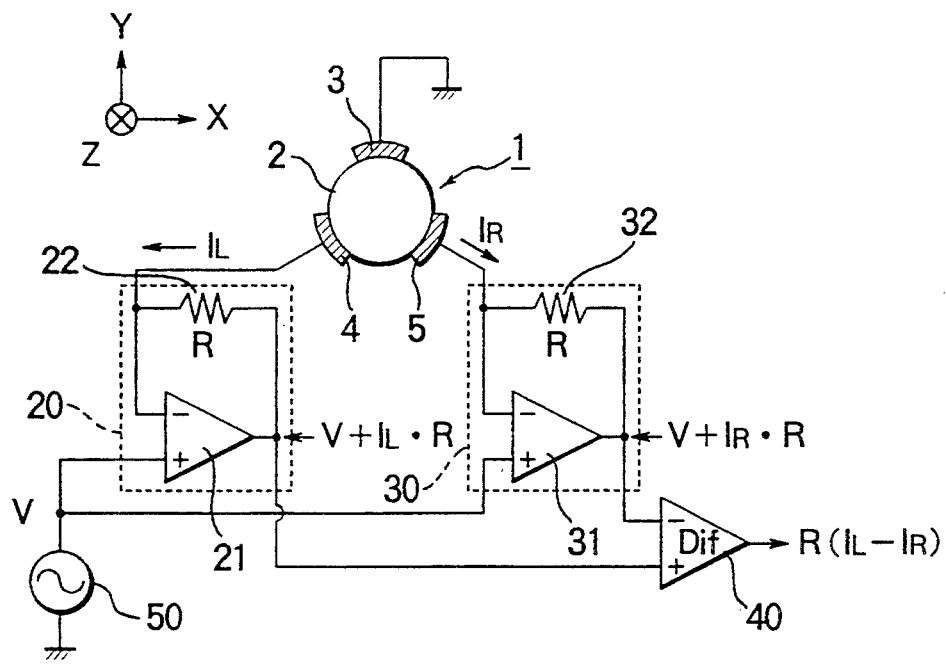
FIG. 5 is a circuit diagram showing a detector circuit of a vibrating gyro according to this invention, which uses the vibrator i of FIG. 1 for detecting the angular velocity.

FIG. 5 is a circuit diagram showing a detector circuit of a vibrating gyro according to this invention, which uses the vibrator 1 of FIG. 1 for detecting the angular velocity. In FIG. 5, the electrode 3 is selected as the grounded electrode, and the other two electrodes 4 and 5 are selected as the driver/detector electrodes of the vibrator 1.

A current detector/driver means 20 for the electrode 4 includes an operational amplifier 21 and a resistor 22. Similarly, a current detector/driver means 30 for the electrode 5 includes an operational amplifier 31 and a resistor 32. The, current detector/driver means 20 and 30 also serve as the current detector and the driver means for the driver/detector electrodes 4 and 5. The output of the operational amplifier 21 is coupled to the inverting input terminal thereof through a resistor 22. Similarly, the output of the operational amplifier 31 is coupled to the inverting input terminal thereof through a resistor 32. Thus the outputs of the current detector/driver means 20 and 30 are negatively fed back through the resistors 22 and 32, respectively. Further, the inverting input terminals of the operational amplifiers 21 and 32 are coupled to the driver/detector electrodes 4 and 5, respectively. The non-inverting input terminal of the operational amplifiers 21 and 32 are coupled to a driver power source 50. Furthermore, the outputs of the the operational amplifiers 21 and 31 are coupled to a differential amplifier 40, the output of which corresponds to the angular velocity of the vibrator 1, as described below.

As described above, the operational amplifiers 21 and 31 are operated under negative feedback. Thus, when an AC voltage V is applied to the non-inverting input terminals of the operational amplifiers 21 and 31 from the driver power source 50, the same level of voltage V is applied on both the driver/detector electrodes 4 and 5.

Generally, a polarized piezoelectric ceramic exhibits an elongational strain when applied with a voltage of the same polarity as that of the polarizing voltage, and a compressional strain when applied with a voltage of the opposite polarity from that of the polarizing voltage. As described above, the vibrating body 2 is polarized in the direction from the electrodes 4 and 5 toward the electrode 3 as shown by the arrows in FIG. 1A. Thus, when the AC voltage V is applied upon the electrodes 4 and 5, the vibrating body 2 elongates and shrinks periodically in the direction of Y-axis. The vibrating body 2 thus vibrates in the direction of the Y-axis.

The outputs of the current detector/driver means 20 and 30 correspond to the current $I_L$ and $I_R$ flowing through the electrodes 4 and 5. The output of the differential amplifier 40, proportional to the difference of its two inputs, thus represents the difference ($I_L - I_R$) of the currents $I_L$ and $I_R$ flowing through the electrodes 4 and 5. Namely, the outputs of the operational amplifiers 21 and 31 are (V+$I_L$·R) and (V+$I_R$·R), respectively, where $I_L$ and $I_R$ are the currents which flow through the electrodes 4 and 5, respectively, when applied with the AC voltage V to vibrate the vibrator 1. The output of differential amplifier 40 is thus proportional to R·($I_L - I_R$), which corresponds to the difference of the currents through the electrodes 4 and 5.

When the vibrating gyro is not rotating, the vibrator 1 vibrates exclusively in the direction of the Y-axis. Thus, the currents IL and IR through the driver/detector electrodes 4 and 5 are equal to each other, and the output of the differential amplifier 40 vanishes.

When, on the other hand, the vibrator 1 rotates around the Z-axis, a vibration in the direction of X-axis is developed in the vibrator 1 due to the Coriolis force, and a difference is developed between the currents $I_L$ and $I_R$ through the electrodes 4 and 5. The output of the differential amplifier 40, corresponding to the difference of the currents $I_L$ and $I_R$, then represents the angular velocity of the vibrator 1.

Figure 6:
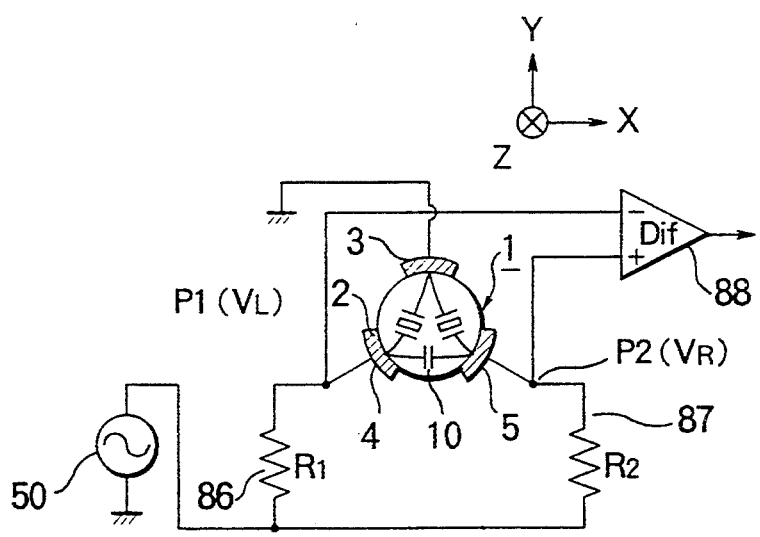
FIG. 6 is a circuit diagram showing a conventional detector circuit for a vibrating gyro, as applied to the vibrator 1 of FIG. 1.

FIG. 6 is a circuit diagram showing a conventional detector circuit for a vibrating gyro, as applied to the vibrator 1 of FIG. 1. The circuit is similar to that of FIG. 21. When an AC voltage V is applied on the driver/detector electrodes 4 and 5 through resistors 86 and 87, respectively, the vibrator 1 undergoes a deflectional vibration in the direction of the Y-axis, and the same level of voltage is developed at the junction points P1 and P2 between the electrodes 4 and 5 and the resistors 86 and 87, respectively. When, however, the vibrator 1 rotates around the Z-axis, a vibration in the direction of X-axis is developed in the vibrator 1 due to the Coriolis force. The impedance of the vibrating body 2 with respect to the electrodes 4 and 5 thus varies, and a difference is developed between the voltages at the junction points P1 and P2 at the electrodes 4 and 5.

Upon the vibrating body 2 of the vibrator 1 are formed three electrodes 3, 4 and 5. Thus, the circuit is equivalent to a structure in which a capacitor 10 is coupled across the electrodes 4 and 5. When a difference is developed between the voltages at the electrodes 4 and 5, a current flows through the capacitor 10. Thus, the voltages at the electrodes 4 and 5 are affected not only by the vibrations of the vibrator 1 in the X- and Y-axis, but also by the current flowing through the capacitor 10, etc. The voltages developed at the electrodes 4 and 5 are thus composites of voltages resulting from various factors. It is difficult to extract the voltage corresponding to the vibration in the X-axis from this composite voltage. The accurate determination of the angular velocity is thus impossible.

By the way, in the circuit of FIG. 5, the vibrator 1 having the structure shown in FIGS. 1A and 1B is used as the vibrator of the detector circuit. The vibrator 11 through 13 of FIGS. 2A and 2B, FIGS. 3A and 3B, and FIGS. 4A and 4B may be used instead. This is also true of the detector circuit of FIG. 7 described below.

Figure 7:
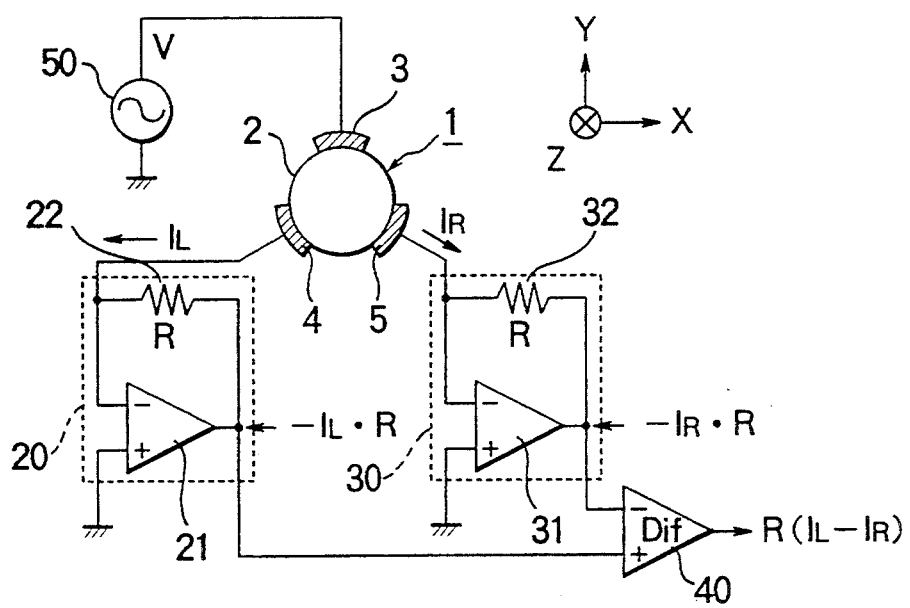
FIG. 7 is a circuit diagram showing another detector circuit for a vibrating gyro according to this invention, which uses the vibrator 1 of FIG. 1 for detecting the angular velocity.

FIG. 7 is a circuit diagram showing another detector circuit for a vibrating gyro according to this invention, which uses the vibrator 1 of FIG. 1 for detecting the angular velocity. The electrode 3 is selected as the grounded electrode, and the other two electrodes 4 and 5 are selected as the driver/detector electrodes. The circuit is similar to that of FIG. 5, except that a driver power source 50 applies an AC voltage V upon the electrode 3 and the non-inverting input terminals of operational amplifiers 21 and 31 are grounded. Thus the operational amplifiers 21 and 31 are operated under negative feedback, and the non-inverting input terminals thereof are grounded. The inverting input terminals of the operational amplifiers 21 and 31 are coupled to the electrodes 4 and 5 of the vibrator 1, respectively. The voltages at the electrodes 4 and 5 are thus at the ground level. Thus the voltages applied across the common electrode 3 and the driver/detector electrodes 4 and 5 are at the same level.

The outputs of the current detector/driver means 20 and 30 corresponds to the current $I_L$ and $I_R$ flowing through the electrodes 4 and 5. The output of the differential amplifier 40, which is proportional to the difference of its two inputs, thus represents the difference of the currents flowing through the electrodes 4 and 5. Namely, the voltages at the electrodes 4 and 5 are at the ground level, and since the vibrating body 2 is polarized in the direction from the electrode 3 toward the electrodes 4 and 5, the vibrator 1 vibrates in the direction of the Y-axis. If the currents flowing through the electrodes 4 and 5 are represented by IL and $I_R$, the outputs of the operational amplifiers 21 and 31 are , respectively. The output of differential amplifier 40 thus is proportional to R·($I_L - I_R$), which corresponds to the difference of the currents through the electrodes 4 and 5.

When the vibrating gyro is not rotating, the vibrator 1 vibrates exclusively in the direction of the Y-axis. Thus, the currents $I_L$ and $I_R$ through the driver/detector electrodes 4 and 5 are equal to each other, and the output of the differential amplifier 40 vanishes.

When, on the other hand, the vibrator 1 rotates around the Z-axis, a vibration in the direction of X-axis is developed in the vibrator 1 due to the Coriolis force, and a difference is developed between the currents $I_L$ and $I_R$ through the electrodes 4 and 5. The output of the differential amplifier 40, corresponding to the difference of the currents $I_L$ and $I_R$, then represents the angular velocity of the vibrator 1.

Figure 8:
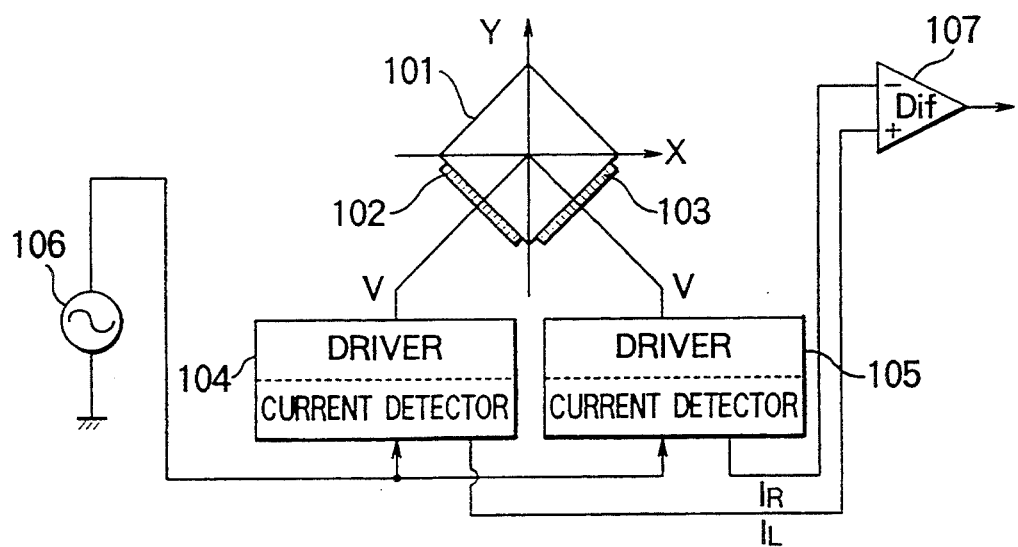
FIG. 8 is a circuit diagram showing still further detector circuit for a vibrating gyro according to this invention.

FIG. 8 is a circuit diagram showing still further detector circuit for a vibrating gyro according to this invention. A vibrator 101 having the form of a rectangular prism is made of a material exhibiting a constant modulus of elasticity, such as elinvar. The transversal section of the vibrator 101 has the form of a square. Two piezoelectric members 102 and 103 are attached on adjacent side surfaces of the vibrator 101 by means of an electrically conductive adhesive. Current detector/driver means 104 and 105 are coupled to the output of a piezoelectric member driver means 106. The outputs from the current detector/driver means 104 and 105, corresponding to the currents $I_L$ and $I_R$ through the electrodes 102 and 103, are input to a differential amplifier 107, the output of which corresponds to the angular velocity of the vibrator 101.

Figure 10:
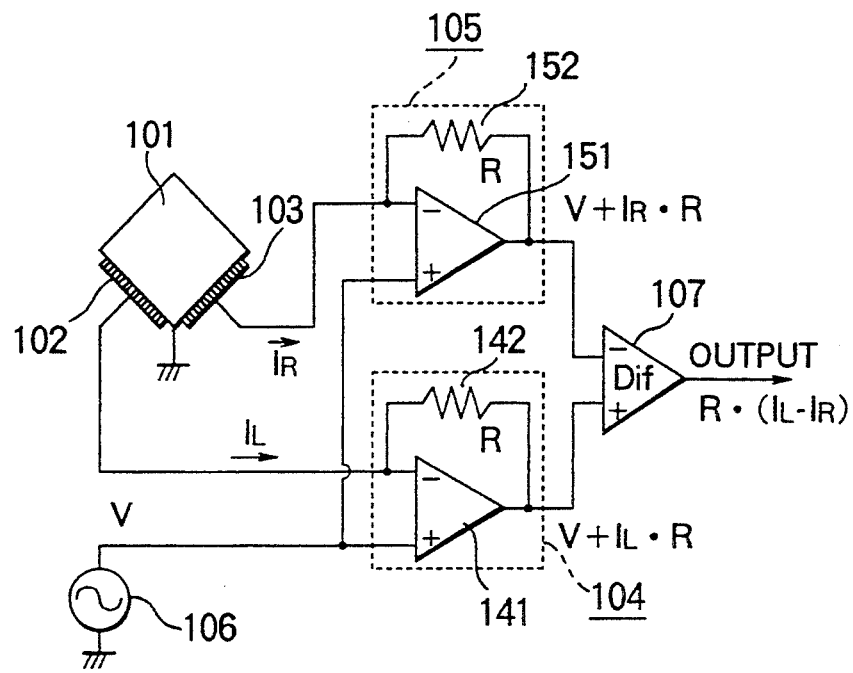
FIG. 10 is a circuit diagram showing an implementation of the current detector/driver means 104 and 105 of FIG. 8.

FIG. 10 is a circuit diagram showing an implementation of the current detector/driver means 104 and 105 of FIG. 8. In the implementation of FIG. 10, the current detector/driver means 104 includes an operational amplifier 141 and a resistor 142. Similarly, the current detector/driver means 105 includes an operational amplifier 151 and a resistor 152. The outputs of the operational amplifiers 141 and 151 are fed back through resistors 142 and 152, respectively, to the inverting input terminal thereof. The operational amplifiers 141 and 151 are thus operated under negative feedback. Further, the non-inverting input terminals of the operational amplifiers 141 and 151 are coupled to the piezoelectric member driver means 106, and the inverting input terminals of the operational amplifiers 141 and 151 are coupled to the piezoelectric members 102 and 103, respectively. The outputs of the operational amplifiers 141 and 151 are coupled to the respective input terminals of the differential amplifier 107.

In the case of the implementation of FIG. 10, the operational amplifiers 141 and 151 are driven under negative feedback. Thus, when the AC voltage V is applied upon the operational amplifiers 141 and 151 from the piezoelectric member driver means 106, a voltage at the same level is applied on the piezoelectric members 102 and 103. In other words, the outputs of the operational amplifiers 141 and 151 are coupled to the piezoelectric members 102 ad 103, respectively, through feedback resistors 142 and 152, respectively, to apply the same voltage on the piezoelectric members 102 and 103, such that currents $I_L$ and $I_R$ flow through the piezoelectric members 102 and 103, respectively.

The outputs of the current detector/driver means 104 and 105 correspond to the currents $I_L$ and $I_R$ flowing through the piezoelectric members 102 and 103. Thus, the output of the differential amplifier 107 is proportional to the difference of the currents $I_L$ and $I_R$ flowing through the piezoelectric members 102 and 103. Namely, if the same AC voltage V is applied on the piezoelectric members 102 and 103 to vibrate the vibrator 101, and the currents flowing through the piezoelectric members 102 and 103 under this circumstance are represented by $I_L$ and respectively, then the outputs of the operational amplifiers 141 and 151 are $(V+I_L \cdot R)$ and $(V+I_R \cdot R)$, respectively. The output of the differential amplifier 107 is thus proportional to $R \cdot (I_L - I_R)$, which represents the difference between the current flowing through the piezoelectric members 102 and 103.

Next, the principle of the detection of the angular velocity by means of the arrangement of FIG. 10 is described, referring to FIGS. 9A through 9D.

Figure 9A:
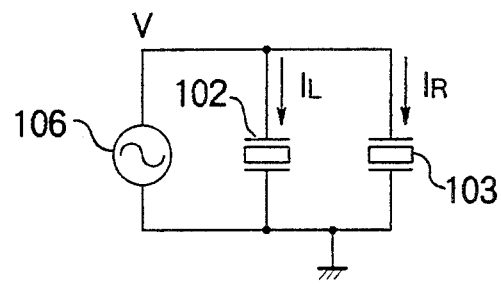
FIG. 9A is a schematic circuit diagram showing the equivalent electrical connections of the piezoelectric members 102 and 103 of FIG. 10.

FIG. 9A is a schematic circuit diagram showing the equivalent electrical connections of the piezoelectric members 102 and 103 of FIG. 10. As shown in FIG. 9A, the piezoelectric members 102 and 103 are coupled across the piezoelectric member driver means 106. When the AC voltage V is thus applied across the piezoelectric members 102 and 103 from the piezoelectric member driver means 106, currents $I_L$ and $I_R$ flow through the piezoelectric members 102 and 103, respectively.

Figure 9B:
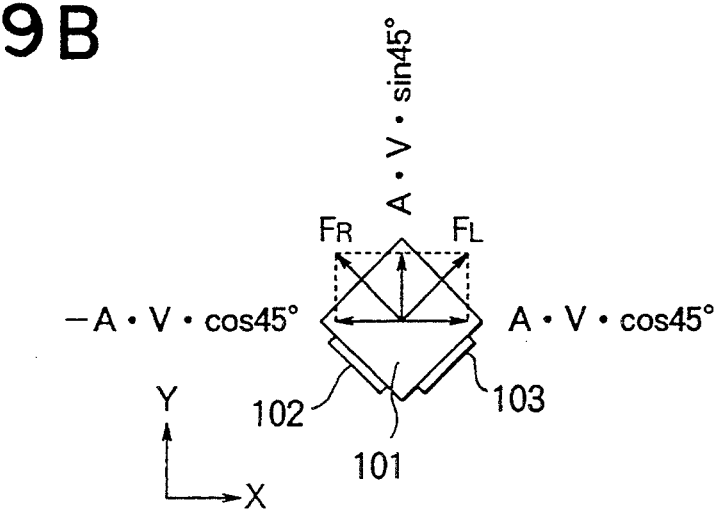
FIG. 9B shows the forces developed by the piezoelectric members by the voltages applied thereon.

FIG. 9B shows the forces developed by the piezoelectric members by the voltages applied thereon. When the AC voltage V is applied on the piezoelectric members 102 and 103, the piezoelectric members 102 and 108 develop forces $F_L$ and $F_R$ perpendicular to the respective main surfaces. These forces $F_L$ and $F_R$ are equal to $A \cdot V_L$ and $A \cdot V_R$, respectively, where A represents the force factor of the piezoelectric members 102 and 103. Thus, if tile unit vectors along the X-axis and the Y-axis ape represented by i and j, respectively, the forces $F_L$ and $F_R$ are given by the following equations:

$$F_L = A \cdot V \cdot \cos 45° \cdot i + A \cdot V \cdot \sin 45° \cdot j$$

$$F_R = -A \cdot V \cdot \cos 45° \cdot i + A \cdot V \cdot \sin 45° \cdot j \quad \ldots (20)$$

Figure 9C:
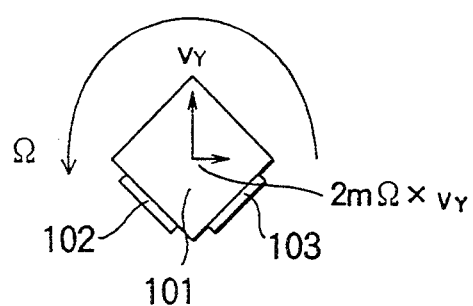
FIG. 9C shows the Coriolis force developed by angular velocity $\Omega$ of the vibrator 81.

The vibrator 101 is driven by the resultant of the two forces $F_L$ and $F_R$ at a velocity $v_Y$ in the direction of the Y-axis. Assume here that the vibrator 101 is rotated at an angular velocity $\Omega$ as shown in FIG. 9C. Then, a Coriolis force acting in the direction of X-axis is developed. If the equivalent mass of the vibrator 101 is represented by m, the Coriolis force $F_c$ is equal to:

$$F_c = 2m \cdot \Omega \cdot v_Y \cdot i \quad \ldots (21)$$

Due to the forces $F_L$ and $F_R$ developed in the piezoelectric members 102 and 103 and the Coriolis force $F_c$, the vibrator 101 vibrates at the velocities $v_X$ and $v_Y$ in the X- and Y-axis, respectively, such that a reaction $F_Z$ is developed in the vibrator 101. If the mechanical impedances of the vibrator are denoted by $Z_X$ and $Z_Y$, respectively, the reaction $F_Z$ is given by the following equation:

$$F_Z = -Z_X \cdot v_X \cdot i - Z_Y \cdot v_Y \cdot j \quad (22)$$

Since the forces $F_L$ and $F_R$ developed in the piezoelectric members 102 and 103, the Coriolis force Fc and the reaction Fz developed in the vibrator 101 are balanced, the resultant of these forces vanishes:

$$0 = F_L + F_R + F_c + F_z \quad \ldots (23)$$

The X- and Y-components of the right-hand side of equation (23) must also vanish. Thus, the following equations are obtained:

$$0 = 2 \cdot m \cdot \Omega \cdot v_Y - Z_X \cdot v_X$$

$$0 = 2 \cdot A \cdot V \cdot \sin 45° - Z_Y \cdot v_Y \quad \ldots (24)$$

Thus, the angular velocity $\Omega$ is given by:

$$\Omega = \frac{Z_X \cdot Z_Y \cdot v_X}{4 \cdot m \cdot A \cdot V \cdot \sin 45°} \quad (25)$$

On the other hand, if the damping admittance of the piezoelectric members 102 and 103 is represented by Y, and the vibrating velocities of the piezoelectric members 102 and 103 in the direction perpendicular to the main surfaces thereof are represented by $v_L$ and $v_R$, respectively, the currents $I_L$ and $I_R$ flowing through the piezoelectric members 102 and 103 are given by:

$$I_L = A \cdot v_L + Y \cdot V \quad \ldots (26a)$$

$$I_R = A \cdot v_R + Y \cdot V \quad \ldots (26b)$$

Figure 9D:
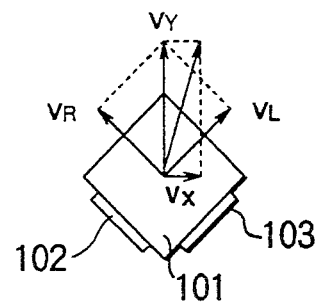
FIG. 9D shows the relationship between the velocities $v_L$ and $v_R$ and the velocities $v_X$ and $v_Y$ by means of a vector diagram.

FIG. 9D shows the relationship between the velocities $v_L$ and $v_R$ and the velocities $v_X$ and $v_Y$ by means of a vector diagram, where the $v_X$ and $v_Y$ are the X- and Y-components of the sum of velocities $v_L$ and $v_R$. Thus, the velocity components $v_X$ and $v_Y$ are:

$$v_X = \cos 45° \cdot (v_L - v_R)$$

$$v_Y = \sin 45° \cdot (v_L + v_R) \quad \ldots (27)$$

Further, subtracting equation (26b) from equation (26a), the following equation is obtained:

$$I_L - I_R = -A \cdot (v_L - v_R) \quad (28)$$

$$= -A \cdot v_X / \cos 45°$$

Eliminating $v_X$ from equation (25) using equation (28), the following representation for the angular velocity $\Omega$ is obtained:

$$\Omega = \frac{Z_X \cdot Z_Y \cdot \cos 45°}{4 \cdot m \cdot A^2 \cdot V \cdot \sin 45°} \cdot (I_L - I_R) \qquad (29)$$

By selecting an appropriate level of the voltage V, the angular velocity $\Omega$ can be determined from the difference of the currents $I_L$ and $I_R$ flowing through the piezoelectric members 102 and 103. Thus, the output of the differential amplifier 107 of FIG. 10 corresponds to the angular velocity $\Omega$.

As seen from equation (29) above, the angular velocity $\Omega$ can be determined without using the damping admittance of the piezoelectric members 102 and 103. Thus, even if the damping admittance varies due to the change in the ambient temperature or the secular change of the vibrator 101, the angular velocity can be determined accurately.

Figure 11:
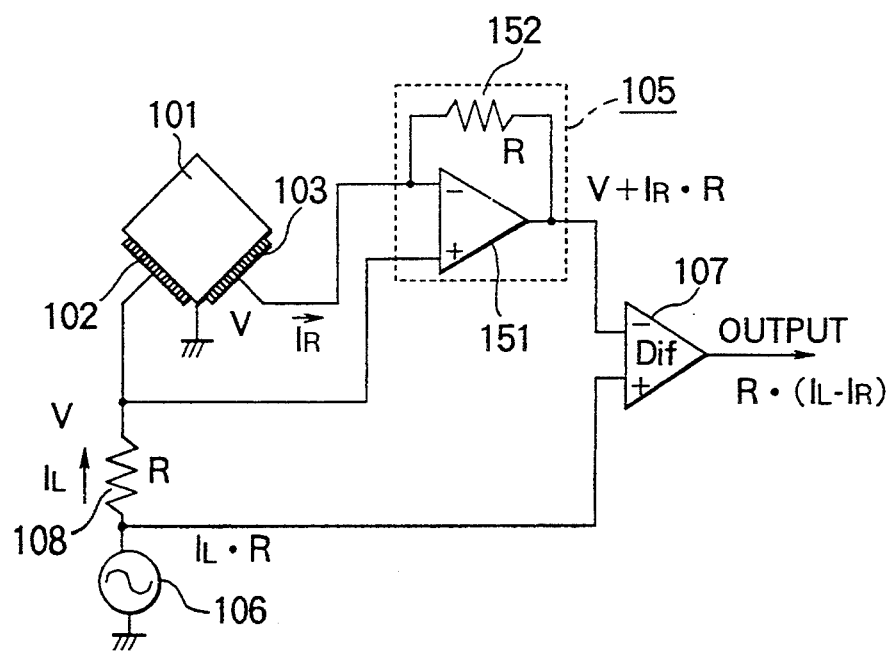
FIG. 11 is a circuit diagram showing still further detector circuit for a vibrating gyro according to this invention.

FIG. 11 is a circuit diagram showing still further detector circuit for a vibrating gyro according to this invention. In FIG. 11, the piezoelectric member 102 is coupled to the piezoelectric member driver means 106 through a resistor 108. The junction point between the resistor 108 and the piezoelectric member 102 is coupled to the non-inverting input terminal of the operational amplifier 151. Further, the junction point, between the resistor 108 and the piezoelectric member driver means 106 is coupled to the non-inverting input terminal of the differential amplifier 107. In the case of the circuit of FIG. 11, the voltage applied on the piezoelectric member 103 is not supplied from the piezoelectric member driver means 106 but is at the same level as the voltage applied on the piezoelectric member 102. Otherwise, the circuit is similar to that of FIG. 10. If the AC voltage V applied on the piezoelectric member 102 is represented by V and the current therethrough is represented by $I_L$, the output of the piezoelectric member driver means 106 is equal to:

$$V + I_L \cdot R \qquad \ldots (30)$$

On the other hand, the output of the current detector/driver means 105 is equal to:

$$V + I_R \cdot R \qquad \ldots (31)$$

Thus, the output of the differential amplifier 107 corresponds to the difference between the currents flowing through the piezoelectric members 102 and 103. The angular velocity $\Omega$ can thus be determined from the the output of the differential amplifier 107.

Figure 12:
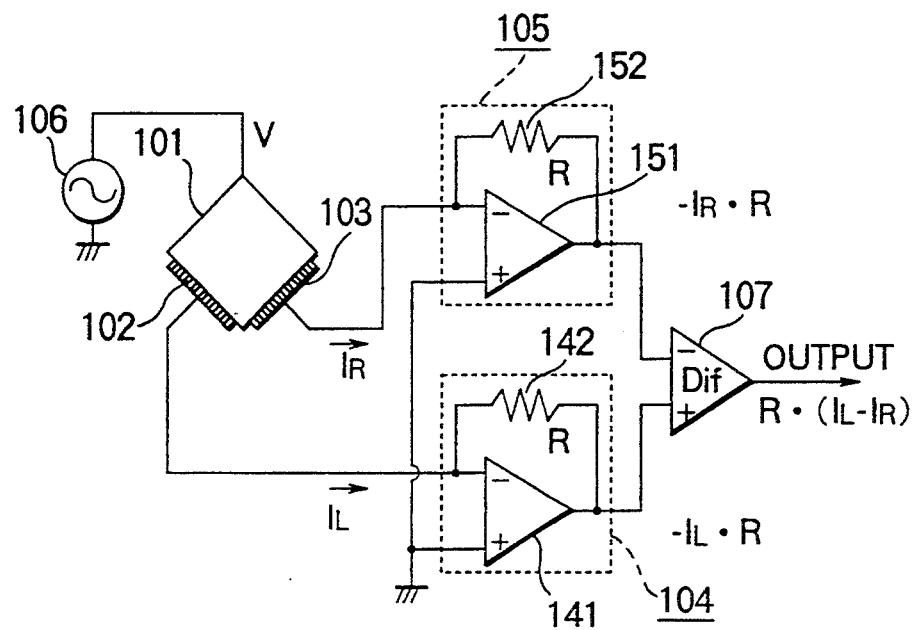
FIG. 12 is a circuit diagram showing still another detector circuit for a vibrating gyro according to this invention.

FIG. 12 is a circuit diagram showing still another detector circuit for a vibrating gyro according to this invention. In FIG. 12, the output of the piezoelectric member driver means 106 is coupled to the vibrator 101 which also serves as the common electrode for the piezoelectric members 102 and 103. Further, the non-inverting input terminals of the operational amplifiers 141 and 151 of the current detector/driver means 104 and 105 are grounded. Otherwise, the circuit of FIG. 12 is similar to that of FIG. 10.

In the case of the circuit of FIG. 12, the non-inverting input terminals of the operational amplifiers 141 and 151 are grounded and the outputs of the operational amplifiers 141 and 151 are coupled to the non-inverting input terminals thereof through the resistors 142 and 152, respectively. Thus, the operational amplifiers 141 and 151 operates in such a manner that the currents $I_L$ and $I_R$ flow through the piezoelectric members 102 and 103 through the resistors 142 and 152 such that the voltages at the piezoelectric members 102 and 103 are at the ground level. Consequently, the voltages applied on the piezoelectric members 102 and 103 are at the same level, and the outputs of the current detector/driver means 104 and 105 correspond to the currents $I_L$ and $I_R$, respectively. Thus, the output of the differential amplifier 107, which is proportional to the difference between the outputs of the current detector/driver means 104 and 105, represents the difference between the currents $I_L$ and $I_R$ flowing through the piezoelectric members 102 and 103. The angular velocity $\Omega$ can thus be determined by means of the principle as expressed by equation (29).

Figure 13:
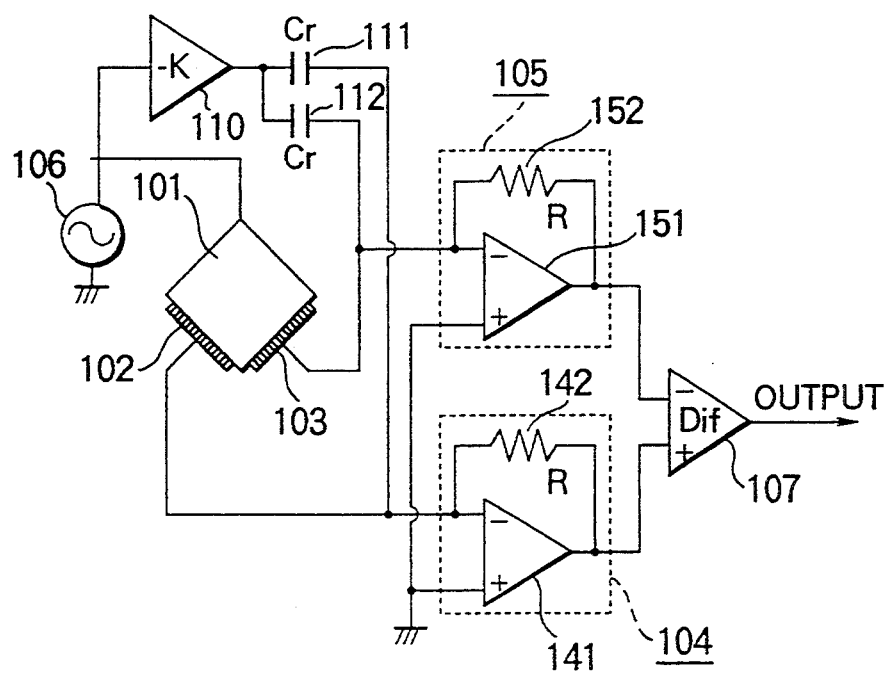
FIG. 13 is a circuit diagram showing still further detector circuit for a vibrating gyro according to this invention.

FIG. 13 is a circuit diagram showing still further detector circuit for a vibrating gyro according to this invention. An inverting amplifier 110 has a negative gain $-K$. The input terminal of the inverting amplifier 110 is coupled to the piezoelectric member driver means 106, and the output of the inverting amplifier 110 is coupled to the inverting input terminals of the operational amplifiers 141 and 151 of the current detector/driver means 104 and 105 through the capacitors 111 and 112. Otherwise the circuit of FIG. 13 is similar to that of FIG. 112.

Figure 14:
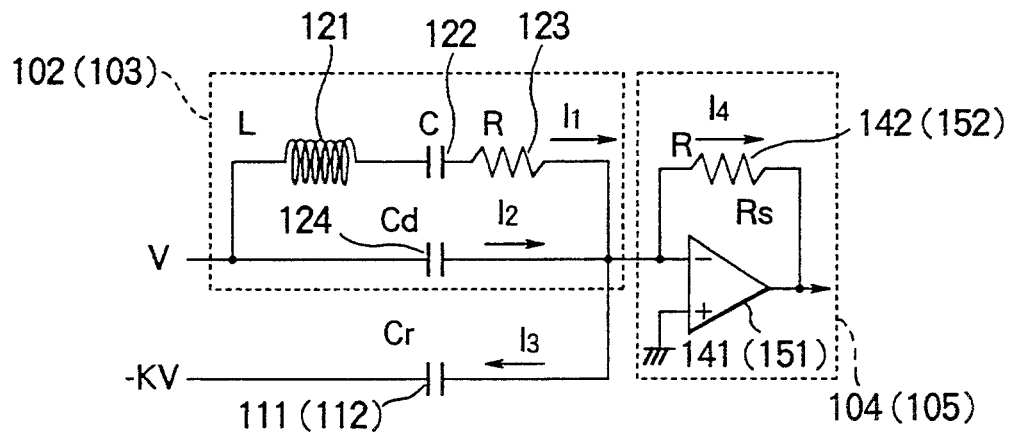
FIG. 14 is a circuit diagram showing an equivalent circuit of a part of the circuit of FIG. 13.

The operation of the circuit of FIG. 13 is described by reference to FIG. 14. FIG. 14 is a circuit diagram showing an equivalent circuit of a part of the circuit of FIG. 13. As shown in FIG. 14, the piezoelectric member 102 (or 103) is equivalent to the circuit consisting of: a coil 121, a capacitor 122, a resistor 123, and a capacitor 124. The coil 121 has the inductance L, the capacitor 122 has the capacitance C, the resistor 123 has the resistance R, and the capacitor 124 has the capacitance Cd. The capacitance of the capacitor 111 (or 112) is represented by Cr. The non-inverting input terminal of the operational amplifier 141 (or 151) is grounded, and to the capacitor 111 (or 112) is applied a voltage $-KV$. Thus, the current $I_3$ flowing through the capacitor 111 (or 112) is equal to:

$$I_3 = j\omega Cr \cdot K \cdot V \qquad \ldots (32)$$

On the other hand, the current $I_2$ flowing through the capacitor 124 representing the damping capacitance of the piezoelectric member 102 (or 103) is given by:

$$I_2 = j\omega Cd \cdot V \qquad \ldots (33)$$

If the relation $K = Cd/Cr$ holds, the current $I_1$ flowing through the serial resonance circuit consisting of the coil 121, the capacitor 122 and the resistor 123 and the current 14 flowing through the resistor 142 (or 152) coupled to the operational amplifier 141 (or 151) are equal to each other, and the output of the operational amplifier 141 (or 151) corresponds to the current flowing through the serial resonance circuit. This current corresponds to the current which is obtained by subtracting the current flowing through the damping admittance Y of the piezoelectric member 102 (or 103) from the current given by equation (26a) or (26b). Thus, the output of the current detector/driver means 104 is equal to:

$$I_L' = A \cdot v_L \qquad \ldots (34)$$

Similarly, the output of the current detector/driver means 105 is equal to:

$$I_R' = A \cdot v_R \qquad \ldots (35)$$

The output of the differential amplifier 107 which corresponds to the difference between the outputs of the current detector/driver means 104 and 105 is thus given by:

$$I_L' - I_R' = A \cdot (v_L - v_R) \qquad \ldots (36)$$

Thus, the output of the differential amplifier 107 is equivalent to that given by the above equation (28). The angular velocity $\omega$ can thus be determined from the output of the differential amplifier 107.

Figure 15:
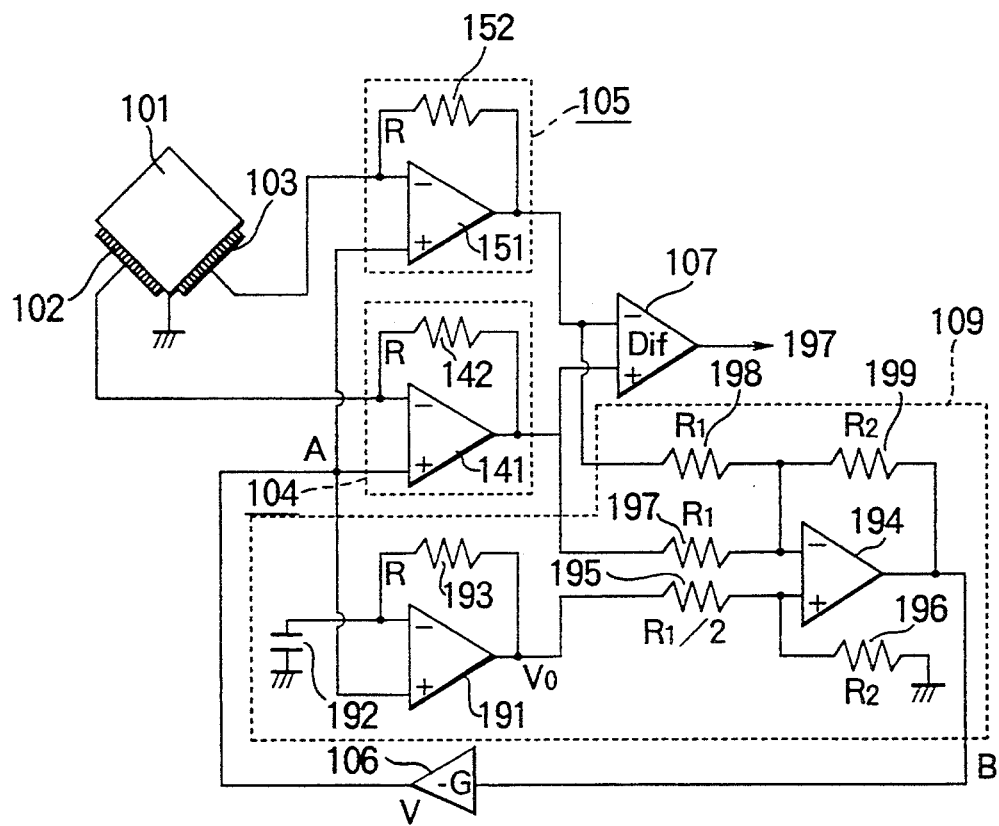
FIG. 15 is a circuit diagram showing still further detector circuit for a vibrating gyro according to this invention.

FIG. 15 is a circuit diagram showing still further detector circuit for a vibrating gyro according to this invention, which undergoes self-oscillation, as described below. The circuit is similar to that of FIG. 10, except for the points described below.

In FIG. 15, a Y-direction vibration detector means 109 has inputs coupled to the outputs of the current detector/driver means 104 and 105. The output of the Y-direction vibration detector means 109 is fed back to the piezoelectric member driver means 106, which, in this circuit, consists of an inverting amplifier.

The Y-direction vibration detector means 109 includes operational amplifiers 191 and 194, a capacitor 192, and resistors 193 and 195 through 199. To the non-inverting input terminal of the operational amplifier 191 is coupled the output of the piezoelectric member driver means 106. The inverting input terminal of the operational amplifier 191 is grounded through the capacitor 192. The capacitance of the capacitor 192 is selected at $Cd = 1/Y$, wherein Y is the damping admittance of the piezoelectric members 102 and 103. Further, the output terminal of the operational amplifier 191 is coupled to the inverting input terminal thereof through a resistor 193.

On the non-inverting input terminal of the operational amplifier 19]is applied a voltage V from the piezoelectric member driver means 106. Thus, the operational amplifier 191 operates in such a manner that the current flows through the capacitor 192 and the resistor 193 such that the same level of voltage V is applied on the inverting input terminal of the operational amplifier 191. The output of the operational amplifier 191 is thus given by the following equation:

$$\begin{aligned} V_0 &= V + Id \cdot R \\ &= V + Y \cdot V \cdot R \end{aligned} \qquad (37)$$

Further, the operational amplifier 194 of the Y-direction vibration detector means 109 constitutes a differential amplifier together with the resistors 195 through 199. The resistors 197 and 198 exhibit a first resistance R1. The resistor 195 exhibits a resistance $R_{\frac{1}{2}}$ *equal to the one half* ($\frac{1}{2}$) *of the resistance of the resistor* 197. *The resistors* 196 *and* 199 *exhibit a second resistance* $R_2$. Thus the differential amplifier outputs a value which is obtained by: (1) subtracting the sum of tile outputs of the current detector/driver means 104 coupled to the resistor 197 and the output of the current detector/driver means 105 coupled to the resistor 198 from double the output of the operational amplifier 191 coupled to the resistor 195; and (2) multiplying the result of subtraction (1) by the ratio $R_2/R_1$ of the resistances of the resistor 197 and the resistor 196. Thus, the output of the operational amplifier 194 is given by:

$$V_0 = (R_2/R_1) \cdot R \cdot (2 \cdot Y \cdot V - (I_L + I_R)) \qquad \ldots (38)$$

On the other hand, by adding the above equations (26a) and (26b), the following equation (39) is obtained:

$$(I_L + I_R) = A \cdot (v_L + v_R) + 2 \cdot Y \cdot V \qquad \ldots (39)$$

Figure 22A:
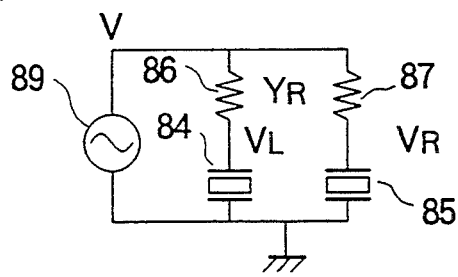
FIG. 22A is a schematic circuit diagram showing the equivalent electrical connections of the driver piezoelectric members 84 and 85 of FIG. 21.
Figure 22B:
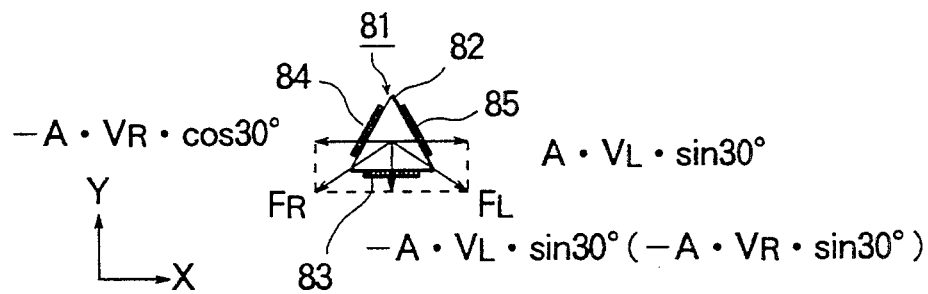
FIG. 22B shows the forces developed by the piezoelectric members by the voltages applied thereon.
Figure 22C:
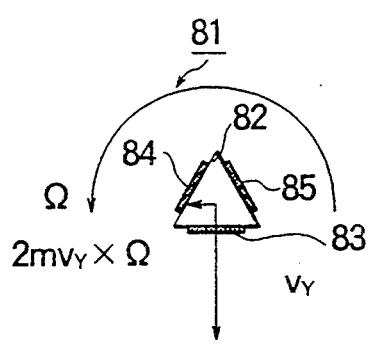
FIG. 22C shows the Coriolis force developed by angular velocity $\Omega$ of the vibrator 81.
Figure 22D:
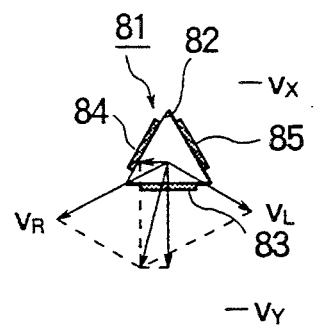
FIG. 22D shows the relationship between the velocities $v_L$ and $v_R$ and the velocities $v_X$ and $v_Y$ by means of a vector diagram.

As shown in FIG. 22D, the vibration velocity $v_Y$ in the direction of the Y-axis is given by:

$$v_Y = \sin 30° \cdot (v_L + v_R)$$

Thus, from equation (39) is obtained:

$$(I_L + I_R) = A \cdot v_Y / \sin 45° + 2 \cdot Y \cdot V \qquad \ldots (40)$$

Substituting the equation (40) in the above equation (38), the following equation is obtained:

$$V_0 = -(R_2/R_1) \cdot R \cdot A \cdot v_Y / \sin 45° \qquad \ldots (41)$$

As seen from equation (41), the output of the Y-direction vibration detector means 109 corresponds to the vibration velocity $v_Y$ of the vibrator 101 in the direction of the Y-axis. On the other hand, as shown by equation (23), the following relation holds between the voltage V applied on the piezoelectric members 102 and 103 and the vibration velocity $v_Y$ in the direction of the Y-axis:

$$Z_Y \cdot v_Y = 2 \cdot A \cdot V \cdot \sin 45° \qquad \ldots (42)$$

By transforming this equation (42), the following equation is obtained:

$$v_Y / V = 2 \cdot A \cdot \sin 45° / Z_Y \qquad \ldots (43)$$

This equation (43) is nothing less than the transfer function of the point B as seen from point A, wherein $Z_Y$ is the mechanical impedance of the vibrator 101 in the direction of the Y-axis, which exhibits a characteristic resonance frequency. The phase of the left-hand side $v_Y/V$ of equation (43) is equal 0° at the resonance frequency, and the gain is at the maximum.

The output of the Y-direction vibration detector means 109, however, corresponds to $-v_Y$. Thus, when the frequency of the voltage V is given at the resonance frequency of mechanical impedance $Z_Y$, the output of the Y-direction vibration detector means 109 is in anti-phase with (i.e., displaced by 180° from) the voltage V. Thus, by constituting the piezoelectric member driver means 106 by an inverting amplifier having a negative gain $-G$, the phase and the gain of the transfer function of the open-loop A—A of FIG. 15 can be made equal to 0° and 0 dB, respectively. Then, the vibrator 101 undergoes self-oscillation at the resonance frequency of the mechanical impedance $Z_Y$ in the direction of the Y-axis.

In the case of the circuit of FIG. 15, the outputs of the current detector/driver means 104 and 105 are input to the Y-direction vibration detector means 109, and the output corresponding to the vibration velocity $v_Y$ of the vibrator 101 in the direction of the Y-axis multiplied by the force factor A of the piezoelectric members 102 and 103 is fed back through the piezoelectric member driver means 106 to the piezoelectric members 102 and 103. The output of the Y-direction vibration detector means 109 si fed back to the piezoelectric members 102 and 103 through the piezoelectric member driver means 106. However, the circuit may have a structure other than this.

For example, assume that, among the resistors coupled to the operational amplifier 194 constituting the differential amplifier of the Y-direction vibration detector means 109, the resistor 197 is eliminated, and the resistors 198 and 199 exhibit the same resistance. Then, the current flowing through the damping admittance is eliminated from the current flowing through the piezoelectric member 103. The output of the operational amplifier 194 thus corresponds to the product of the velocity $v_R$ of the piezoelectric member 103 in the perpendicular direction thereof and the force factor A of the piezoelectric member.

Further, the vibration velocity $v_Y$ in the direction of the Y-axis generated by the forces developed by the piezoelectric members 102 and 103 is much larger than the vibration velocity $v_X$ in the direction of the X-axis, which is due to the velocity $v_Y$ in the direction of the Y-axis and the angular velocity $\Omega$:

$$v_Y >> v_X$$

Thus, the velocities $v_L$ and $v_R$ are approximately equal to each other, and hence the following approximate equation is obtained:

$$v_Y = 2 . \sin 45° . v_L \qquad \ldots (44)$$

Thus, the vibrator 101 undergoes self-oscillation with the above described modification of the circuit of FIG. 15.

Figure 16:
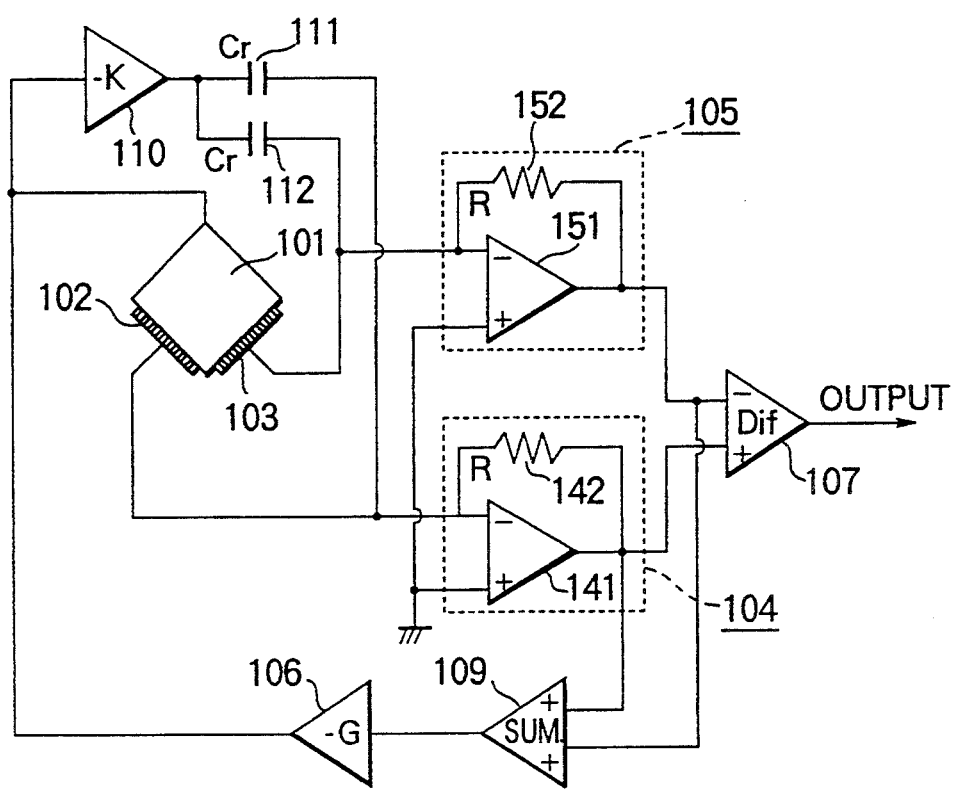
FIG. 16 is a circuit diagram showing still another detector circuit for a vibrating gyro according to this invention.

FIG. 16 is a circuit diagram showing still another detector circuit for a vibrating gyro according to this invention. The circuit of FIG. 16 is similar to those of FIGS. 13 and 15, except for the points specified below.

In FIG. 16 the outputs of the current detector/driver means 104 and 105 correspond to the values obtained by eliminating from the currents flowing through the piezoelectric members 102 and 103 applied with the voltage V the currents flowing through tile damping admittances of the piezoelectric members 102 and 103. Namely, the outputs of the current detector/driver means 104 and 105 correspond to the products of force factor A of the piezoelectric member and the perpendicular vibration velocity $v_L$ and $v_R$ of the piezoelectric members 102 and 103, respectively.

Thus, the output of the Y-direction vibration detector means 109 which adds the outputs of the current detector/driver means 104 and 105 corresponds to A . ($v_L + v_R$), and thus an output corresponding to A . $v_Y$ is obtained. Thus, by feeding back the output of the Y-direction vibration detector means 109 through the piezoelectric member driver means 106, the vibrator undergoes self-oscillation, as described above by reference to FIG. 15. Further, the Y-direction vibration detector means 109 (adder) may be dispensed with. Namely, by feeding back one of the outputs of the current detector/driver means 104 and 105 through the piezoelectric member driver means 106, the vibrator 101 undergoes self-oscillation.

Figure 17:
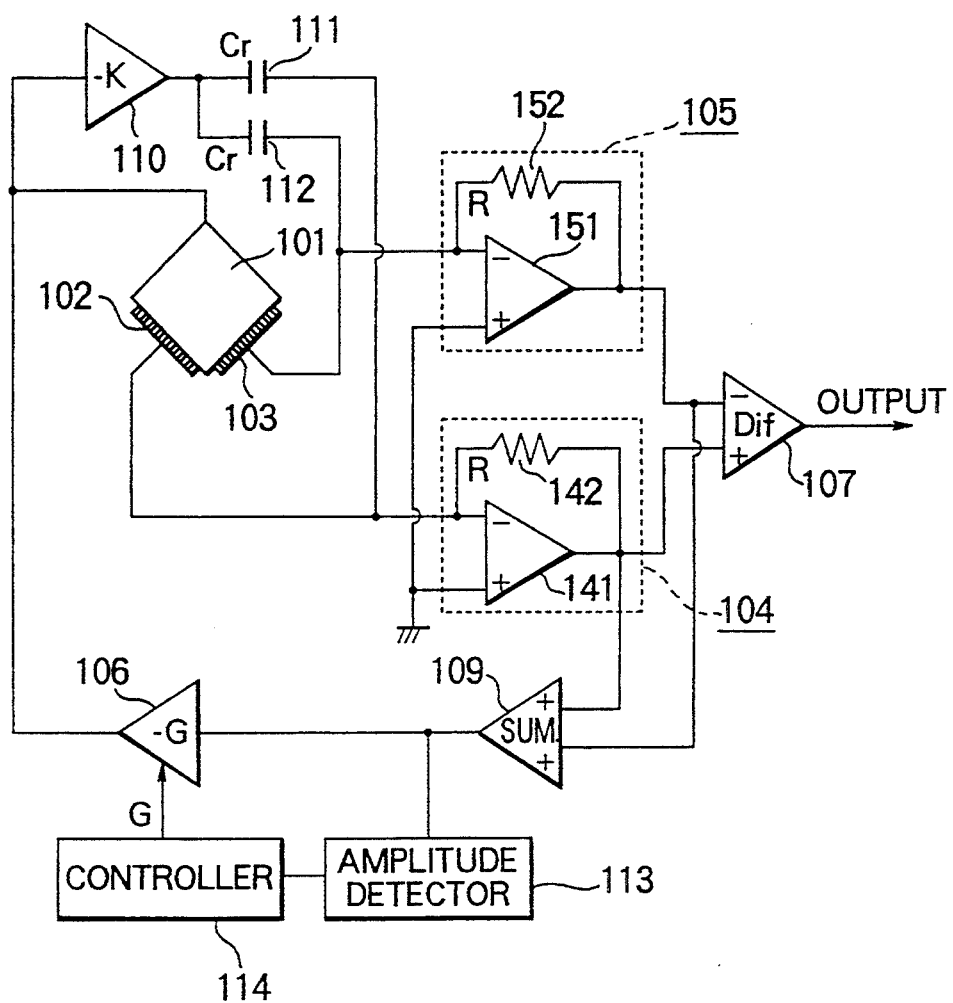
FIG. 17 is a circuit diagram showing still further detector circuit for a vibrating gyro according to this invention.

FIG. 17 is a circuit diagram showing still further detector circuit for a vibrating gyro according to this invention. The circuit of FIG. 17 is similar to that of FIG. 16, except for the points described below. In FIG. 17, the output of the Y-direction vibration detector means 109 is input not only to the piezoelectric member driver means 106 but also to an amplitude detector 113, which detects the amplitude of the AC voltage output from the Y-direction vibration detector means 109. Further, a controller 114 controls the gain of the piezoelectric member driver means 106 such that the output of the amplitude detector 113 is kept at a predetermined constant level.

Next the operation of the circuit of FIG. 17 is described. When an equal voltage V is applied on the piezoelectric members 102 and 103 from the inverting amplifier 110 through capacitors 111 and 112, respectively, the difference between the currents flowing through the piezoelectric members 102 and 103 is given by the above equation (29). On the other hand, the output of the Y-direction vibration detector means 109 is, as described above by reference to FIG. 16, corresponds to the vibration velocity A . $v_Y$ of the vibrator 101 in the direction of the Y-axis multiplied by A. Further, from equation (23) is obtained:

$$v_Y = 2 . A . V . \sin 45°/Z_Y \qquad \ldots (45)$$

Thus, controlling the output of the amplitude detector 113 to a constant level is equivalent to maintaining the value of the following equation at a constant level:

$$A . v_Y = 2 . V . \sin 45°/Z_Y \qquad \ldots (46)$$

Thus, from equation (29) is obtained the following equation:

$$\Omega = Const . Z_X . (I_L - I_R) \qquad \ldots (47)$$

where Const represents a constant.

Thus the force factor A which is a characteristic of the piezoelectric members 102 and 103 is eliminated from the equation for determining the angular velocity $\Omega$. The determination of the angular velocity $\Omega$ thus depends only on the mechanical impedance $Z_X$ of the vibrator 101 in the direction of the X-axis.

Figure 18:
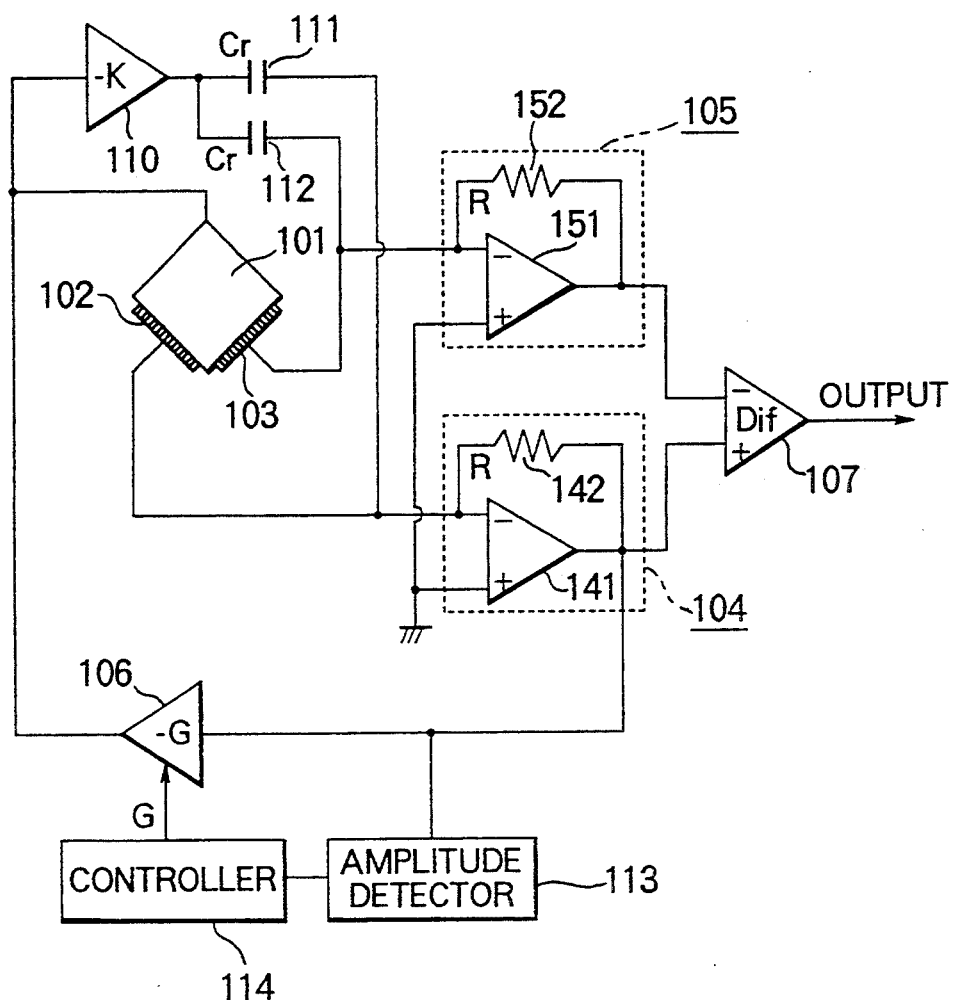
FIG. 18 is a circuit diagram showing still further detector circuit for a vibrating gyro according to this invention.

FIG. 18 is a circuit diagram showing still further detector circuit for a vibrating gyro according to this invention. The circuit of FIG. 18 is similar to that of FIG. 16, except for the points described below. The circuit of FIG. 18 gives an example of a structure by which the operation equivalent to that of the circuit of FIG. 17 is accomplished in the circuit where one of the outputs of the current detector/driver means 104 and 105 is fed back to the piezoelectric member driver means 106 so as to subject the vibrator 101 to self-oscillation.

In the case of the circuit of FIG. 17, the amplitude detector 113 detects the amplitude of the sum of the outputs of the current detector/driver means 104 and 105. In the case of the circuit of FIG. 18, however, the amplitude detector 113 detects exclusively the amplitude of the current detector/driver means 104. As in the case of the circuit of FIG. 17, the controller 114 controls the gain of the piezoelectric member driver means 106 such that the output of the amplitude detector 113 is kept at a predetermined constant level.

On the other hand, as described above, the following approximate equation holds:

$$v_Y = 2 . \sin 45° . v_L \qquad \ldots (48)$$

Thus, the output of the amplitude detector 113 of FIG. 18 corresponds to the output of the amplitude detector 113 of FIG. 17. As a result, as in the case of the circuit of FIG. 17, the angular velocity $\Omega$ can be determined using equation (47). The force factor A which is a characteristic of the piezoelectric members 102 and 103 is eliminated from the equation for determining the angular velocity $\Omega$. The determination of the angular velocity $\Omega$ thus depends only on the mechanical impedance Zx of the vibrator 101 in the direction of the X-axis.

By the way, in the case of the circuit of FIG. 18, the output of the current detector/driver means 104 fed back to the piezoelectric member driver means 106 is coupled to the amplitude detector 113. The the input of the amplitude detector 113 may, however, be coupled to the output of the other current detector/driver means 105. Alternatively, an adder calculating the sum of the outputs of the current detector/driver means 104 and 105 may be provided such that the output thereof is supplied to the amplitude detector 113.

Further, in the case of the circuit of FIG. 18, the combination with the detector circuit of FIG. 16 has been described. However, the detector circuit may be different from that of FIG. 16. The detector circuits shown in other figures may be used instead and the same advantages as those of the circuit of FIG. 18 are obtained, provided that the gain of the piezoelectric member driver means 106 is controlled such that the output corresponding to $A \cdot v_Y$ or the output corresponding to $A \cdot v_L$ and $A \cdot v_R$ is held at a predetermined level.

What is claimed is:

1. A vibrator for a vibrating gyro comprising:
   a column-shaped piezoelectric body exhibiting a bilateral symmetry with respect to a central plane parallel to a longitudinal axis of said column-shaped vibrating body;
   exclusively three electrodes formed on an outer surface of said piezoelectric body;
   first one of said three electrodes being a common electrode formed on the outer side surface of said piezoelectric body along an intersection of said outer side surface with said central plane; and
   two other electrodes of said three electrodes formed on said outer side surface of said vibrating body separated from said common electrode by an equal circumferential distance;
   wherein said piezoelectric body is polarized in a direction of respective curves connecting said common electrode and said two other electrodes.

2. A vibrator as claimed in claim 1, wherein said vibrating body has the form of a cylinder.

3. A vibrator as claimed in claim 1, wherein said vibrating body has the form of a partial cylinder.

4. A vibrator as claimed in claim 1, wherein said vibrating body has the form of a triangular prism.

5. A motion detector having a differential circuit coupled to a piezoelectric gyro wherein said piezoelectric gyro comprises:
   a column-shaped piezoelectric body exhibiting a bilateral symmetry with respect to a central plane parallel to a longitudinal axis of said column-shaped vibrating body;
   exclusively three electrodes formed on an outer surface of said piezoelectric body;
   first one of said three electrodes being a common electrode formed on the outer side surface of said piezoelectric body along an intersection of said outer side surface with said central plate; and
   two other electrodes of said three electrodes formed on said outer side surface of said vibrating body separated from said common electrode by an equal circumferential distance;
   wherein said piezoelectric body is polarized in a direction of respective curves connecting said common electrode and said two other electrodes; and
   wherein said differential circuit comprises:
   a driver coupled to said two other electrodes, for applying an equal level of voltage across said common electrode and said two other electrodes;
   current detector, coupled to said two other electrodes, for detecting currents flowing through said two other electrodes, respectively, said current detector generating two outputs corresponding to said two currents, respectively;
   difference difference calculator, coupled to said current detector, for calculating a difference of said two outputs of said current detector, wherein said output from said difference calculator corresponds to an angular velocity of said vibrator around said axis thereof.

6. A detector circuit having a differential calculator for detecting a motion of a vibrating gyro, wherein said vibrating gyro comprises:
   a vibrating body upon which at least one common electrode is affixed; and
   two driver/detector electrodes disposed upon respective two side surfaces of said vibrating body;
   and wherein said detector circuit comprises:
   a driver for applying an AC voltage across said at least one common electrode and said two driver/detector electrodes, said AC voltage applying an equal level of voltage across said common electrode and said two driver/detector electrodes; a first current detector comprising a first operational amplifier having a non-inverting input terminal coupled to an AC voltage source and an inverting input terminal coupled to a first of said two driver/detector electrodes; and a first feedback resistor coupled across an output of said first operational amplifier and said inverting input terminal of said first operational amplifier; said output of said first operational amplifier being input to a first input of said differential calculator; and
   a second current detector comprising a second operational amplifier having a non-inverting input terminal coupled to said AC voltage source and an inverting input terminal coupled to a second of said two driver/detector electrodes; and a second feedback resistor coupled across an output of said second operational amplifier and said inverting input terminal of said second operational amplifier; said output of said second operational amplifier being input to a second input of said differential calculator; and
   wherein said differential calculator calculating a difference of said first and second outputs of said first and second current detectors, wherein said difference corresponds to an angular velocity of said vibrator.

7. A detector circuit as claimed in claim 6, wherein said vibrator body has the form of a rectangular prism exhibiting a square transversal section and said two piezoelectric members are formed on adjacent two side surfaces of said vibrator body.

8. A detector circuit having a differential calculator for detecting the motion of a vibrating gyro, comprising:

a vibrator including a common electrode and two driver/detector members disposed upon respective two side surfaces of said vibrator;

a driver for applying an AC voltage across said common electrode and said two driver/detector members said AC voltage applying an equal level of voltage across said common electrode and said two driver/detector members;

a first current detector comprising a first operational amplifier having a non-inverting input terminal coupled to an AC voltage source through a detection resistor and an inverting input terminal coupled to a first of said two driver/detector members; and a first feedback resistor coupled across an output of said first operational amplifier and said inverting input terminal of said first operational amplifier;

9. A detector circuit having a differential calculator for detecting a rotation of a vibrating gyro, comprising:

a vibrator including a common electrode and two driver/detector members disposed upon respective two side surfaces of said vibrator body;

a driver for applying an AC voltage across said common electrode and said two driver/detector members, said AC voltage applying an equal level of voltage across said common electrode and said two driver/detector members;

a first current detector comprising a first operational amplifier having a grounded non-inverting input terminal and an inverting input terminal coupled to a first of said two driver/detector members; and a first feedback resistor coupled across an output of said first operational amplifier and said inverting input terminal of said first operational amplifier; said output of said first operational amplifier being input to first input of said differential calculator; and a second current detector comprising a second operational amplifier having a grounded non-inverting input terminal and an inverting input terminal coupled to a second of said two driver/detector members; and a second feedback resistor coupled across an output of said second operational amplifier and said inverting input terminal of said second operational amplifier; said output of said second operational amplifier being input to second input of said differential calculator;

said differential calculator calculating a difference of said first and second outputs of said first and second current detectors, wherein said difference corresponds to an angular velocity of said vibrator, 10. A detector circuit as claimed in claim 9, further comprising:

an inverting amplifier having an input coupled to said driver;

a first capacitor coupled across an output of said inverting amplifier and an inverting input terminal of said first operational amplifier; and a second capacitor coupled across said output of said inverting amplifier and an inverting input terminal of said second operational amplifier.

said output of said first operational amplifier being input to a first input of said differential calculator;

wherein said detection resistor is coupled across said AC voltage source and a second one of said two piezoelectric members;

second current detector comprising said detection resistor, and a junction point between said detection resistor and said AC voltage source being coupled to a second input of said differential calculator;

said differential calculator calculating a difference of said first and second outputs of said first and second current detectors, wherein said difference corresponds to an angular velocity of said vibrator.

11. A detector circuit of a vibrating gyro comprising:

a vibrator including a common electrode and two driver/detector members formed upon respective two side surfaces of said vibrator;

first and second current detectors for detecting currents flowing through said two driver/detector members, respectively, said first and second current detectors generating first and second outputs corresponding to said currents flowing through said two driver/detector members, respectively;

a driver comprising an inverter amplifier for driving said two driver detector members at an equal voltage level;

feedback circuit for feeding back an output of at least one of said first and second current detectors to said drive/detector member driver, thereby subjecting said vibrator into self-oscillation; and differential calculator coupled to said first and second current detectors, for calculating a difference of said first and second outputs of said first and second current detectors, wherein said difference corresponds to an angular velocity of said vibrator.

12. A detector circuit as claimed in claim 11, wherein: said feedback circuit feeds back a voltage corresponding to a velocity of said vibrator body along a predetermined direction.

13. A detector circuit as claimed in claim 13, wherein: said first current detector comprises a first operational amplifier having a non-inverting input terminal coupled to an output of said driver and an inverting input terminal coupled to a first of said two driver/detector members; and a first feedback resistor coupled across an output of said first operational amplifier and said inverting input terminal of said first operational amplifier; said output of said first operational amplifier being input to a first input of said feedback circuit; and said second current detector comprises a second operational amplifier having a non-inverting input terminal coupled to said output of said driver and an inverting input terminal coupled to a second of said two driver/detector members; and a second feedback resistor coupled across an output of said second operational amplifier and said inverting input terminal of said second operational amplifier; said output of said second operational amplifier being input to a second input of said feedback circuit.

* * * * *